US011902584B2

(12) United States Patent
Li et al.

(10) Patent No.: US 11,902,584 B2
(45) Date of Patent: Feb. 13, 2024

(54) SIGNALING OF PICTURE HEADER PARAMETERS

(71) Applicant: TENCENT AMERICA LLC, Palo Alto, CA (US)

(72) Inventors: Ling Li, Palo Alto, CA (US); Xiaozhong Xu, State College, PA (US); Byeongdoo Choi, Palo Alto, CA (US); Xiang Li, Los Gatos, CA (US); Stephan Wenger, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/026,748

(22) Filed: Sep. 21, 2020

(65) Prior Publication Data
US 2021/0195247 A1 Jun. 24, 2021

Related U.S. Application Data

(60) Provisional application No. 62/950,453, filed on Dec. 19, 2019.

(51) Int. Cl.
H04N 19/70 (2014.01)
H04N 19/159 (2014.01)
H04N 19/174 (2014.01)

(52) U.S. Cl.
CPC ........... *H04N 19/70* (2014.11); *H04N 19/159* (2014.11); *H04N 19/174* (2014.11)

(58) Field of Classification Search
CPC ..... H04N 19/70; H04N 19/159; H04N 19/174
See application file for complete search history.

(56) References Cited

U.S. PATENT DOCUMENTS

| 2012/0189053 | A1  | 7/2012  | Chen et al. |
| 2014/0003510 | A1  | 1/2014  | Lu et al. |
| 2014/0036999 | A1  | 2/2014  | Ryu et al. |
| 2014/0198181 | A1  | 7/2014  | Chen et al. |
| 2015/0264404 | A1* | 9/2015  | Hannuksela ......... H04N 19/463 375/240.16 |
| 2015/0296224 | A1* | 10/2015 | Davis .................. H04N 19/188 375/240.26 |
| 2017/0048550 | A1  | 2/2017  | Hannuksela |
| 2018/0103271 | A1* | 4/2018  | Wang ................... H04N 19/103 |
| 2019/0208225 | A1* | 7/2019  | Chen ..................... H04N 19/70 |

OTHER PUBLICATIONS

International Search Report dated Mar. 23, 2021, issued by the International Searching Authority in application No. PCT/US 20/65899.
Written Opinion dated Mar. 23, 2021, issued by the International Searching Authority in application No. PCT/US 20/65899.
Communication dated Jan. 18, 2023 from the Intellectual Property Office of Singapore in Application No. 11202111260R.

(Continued)

*Primary Examiner* — Joseph W Becker
(74) *Attorney, Agent, or Firm* — Sughrue Mion, PLLC

(57) ABSTRACT

A method, computer program, and computer system for encoding or decoding video data, and indicating, with a syntax element, types of slices for all slices of a coded picture, the syntax element being coded using an unsigned integer.

16 Claims, 3 Drawing Sheets

(56) References Cited

OTHER PUBLICATIONS

Hendry et al., "AHG17: On access unit delimiter and picture header", WG 05 MPEG Joint Video Coding Team(s) with ITU-T SG 16, 2019, JVET-P0120 for Geneva meeting (MPEG No. m50071), pp. 40-46, 52-55, 100-110 (35 pages total).
Office Action dated Oct. 4, 2022 issued by the Japanese Patent Office in Japanese Application No. 2021-556786.
Office Action dated Aug. 9, 2023 in Korean Application No. 10-2021-7027127.
Benjamin Bross et al., "Versatile Video Coding (Draft 7)", Joint Video Experts Team (JVET) of ITU-T SG 16 WP 3 and ISO/IEC JTC 1/SC 29/WG 11, JVET-P2001-vE, Oct. 1-11, 2019, Geneva, CH, 16th Meeting (492 pages total).
Zequn Jie, "Deep Self-Taught Learning for Weakly Supervised Object Localization", arXiv:1704.05188v2 [cs.CV], Apr. 30, 2017 (9 pages total).
Extended European Search Report dated Nov. 24, 2023 in European Application No. 20901609.6.
Communication dated Dec. 12, 2023 in European Application No. 20901609.6.
Itu-T: "High efficiency video coding. ITU-T H.265", Series H: Audiovisual and Multimedia Systems Infrastructure of audiovisual services—Coding of moving video, Apr. 1, 2013 (Apr. 1, 2013), XP093070999, Retrieved from the Internet: URL: ttps://www.itu.int/rec/dologin_pub.asp?lang=e&id=T-REC-H.265-201304-S!!PDF-E&type=items [retrieved on Aug. 5, 2023].

* cited by examiner

Computer System 300

SIGNALING OF PICTURE HEADER PARAMETERS

CROSS-REFERENCE TO RELATED APPLICATION

This application claims priority based on U.S. Provisional Application No. 62/950,453, filed Dec. 19, 2019, the entirety of which is incorporated herein by reference.

FIELD

This disclosure relates generally to video encoding/decoding, and generally describes next-generation video coding technologies beyond HEVC (High Efficiency Video Coding), e.g., Versatile Video Coding (VVC). More specifically, this disclosure relates generally to methods and apparatuses related to picture header handling.

BACKGROUND

Proposed VVC Draft 7 includes a HLS (High Level Syntax) called picture header that contains syntax elements applying to all slices of a coded picture, e.g., to avoid signalling syntax elements in slice header(s) that are constrained to have the same values for all slices of a picture.

Picture Parameter Set

HLS specifies syntax elements that may be applied to lower level coding tools. For example, CTU (Coding Tree Unit) size may be specified at the sequence level, or SPS (Sequence Parameter Set), and is not generally changed from picture to picture. Typical HLS includes SPS, PPS (Picture Parameter Set), PH (Picture Header), SH (Slice Header), and APS (Adaptive Parameter Set).

Different HLS includes levels of applications, such that commonly used syntax elements do not need to be coded repeatedly. For instance, SPS specifies general syntax elements applicable to sequence levels. PH specifies general syntax elements applicable to a coded picture, which may consist of one or more slices.

Syntax elements included in PPS in VVC Draft 7 are described as follows:

TABLE 1

| Syntax Elements Included in PPS in VVC Draft 7. | |
|---|---|
| Syntax Element | Descriptor |
| pic_parameter_set_rbsp( ) { | |
|   pps_pic_parameter_set_id | ue(v) |
|   pps_seq_parameter_set_id | u(4) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   scaling_window_flag | u(1) |
|   if( scaling_window_flag ) { | |
|     scaling_win_left_offset | ue(v) |
|     scaling_win_right_offset | ue(v) |
|     scaling_win_top_offset | ue(v) |
|     scaling_win_bottom_offset | ue(v) |
|   } | |
|   output_flag_present_flag | u(1) |
|   mixed_nalu_types_in_pic_flag | u(1) |
|   pps_subpic_id_signalling_present_flag | u(1) |
|   if( pps_subpics_id_signalling_present_flag ) { | |
|     pps_num_subpics_minus1 | ue(v) |
|     pps_subpic_id_len_minus1 | ue(v) |
|     for( i = 0; i <= pps_num_subpic_minus1; i++ ) | |
|       pps_subpic_id[ i ] | u(v) |
|   } | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     rect_slice_flag | u(1) |
|     if( rect_slice_flag ) | |
|       single_slice_per_subpic_flag | u(1) |
|     if( rect_slice_flag && !single_slice_per_subpic_flag ) { | |
|       num_slices_in_pic_minus1 | ue(v) |
|       tile_idx_delta_present_flag | u(1) |
|       for( i = 0; i < num_slices_in_pic_minus1; i++ ) { | |
|         slice_width_in_tiles_minus1[ i ] | ue(v) |
|         slice_height_in_tiles_minus1[ i ] | ue(v) |
|         if( slice_width_in_tiles_minus1[ i ] = = 0 | |

TABLE 1-continued

Syntax Elements Included in PPS in VVC Draft 7.

| Syntax Element | Descriptor |
|---|---|
| &&     slice_height_in_tiles_minus1[ i ] = = 0 ) {         num_slices_in_tile_minus1[ i ] | ue(v) |
|         num_SlicesInTileMinus1 = num_slices_in_tile_minus1[ i ]         for( j = 0; j < num_SlicesInTileMinus1; j++ )     slice_height_in_ctu_minus1[ i++ ] | ue(v) |
|     }         if( tile_idx_delta_present_flag && i < num_slices_in_pic_minus1 )         tile_idx_delta[ i ] | se(v) |
|     } }   loop_filter_across_tiles_enabled_flag | u(1) |
|   loop_filter_across_slices_enabled_flag | u(1) |
| } entropy_coding_sync_enabled_flag | u(1) |
| if( !no_pic_partition_flag entropy_coding_sync_enabled_flag )   entry_point_offsets_present_flag | u(1) |
| cabac_init_present_flag | u(1) |
| for( i = 0; i < 2; i++ )   num_ref_idx_default_active_minus1[ i ] | ue(v) |
| rpl1_idx_present_flag | |
| init_qp_minus26 | se(v) |
| log2_transform_skip_max_size_minus2 | ue(v) |
| cu_qp_delta_enabled_flag | u(1) |
| pps_cb_qp_offset | se(v) |
| pps_cr_qp_offset | se(v) |
| pps_joint_cbcr_qp_offset_present_flag | u(1) |
| if( pps_joint_cbcr_qp_offset_present_flag )   pps_joint_cbcr_qp_offset_value | se(v) |
| pps_slice_chroma_qp_offsets_present_flag | u(1) |
| pps_cu_chroma_qp_offset_list_enabled_flag | u(1) |
| if( pps_cu_chroma_qp_offset_list_enabled_flag ) {   chroma_qp_offset_list_len_minus1 | ue(v) |
|   for( i = 0; i <= chroma_qp_offset_list_len_minus1; i++ ) {     cb_qp_offset_list[ i ] | se(v) |
|     cr_qp_offset_list[ i ] | se(v) |
|     if( pps_joint_cbcr_qp_offset_present_flag )       joint_cbcr_qp_offset_list[ i ] | se(v) |
|   } } | |
| pps_weighted_pred_flag | u(1) |
| pps_weighted_bipred_flag | u(1) |
| deblocking_filter_control_present_flag | u(1) |
| if( deblocking_filter_control_present_flag ) {   deblocking_filter_override_enabled_flag | u(1) |
|   pps_deblocking_filter_disabled_flag | u(1) |
|   if( !pps_deblocking_filter_disabled_flag ) {     pps_beta_offset_div2 | se(v) |
|     pps_tc_offset_div2 | se(v) |
|   } } | |
| constant_slice_header_params_enabled_flag | u(1) |
| if( constant_slice_header_params_enabled_flag ) {   pps_dep_quant_enabled_idc | u(2) |
|   for( i = 0; i < 2; i++ )     pps_ref_pic_list_sps_idc[ i ] | u(2) |
|   pps_mvd_l1_zero_idc | u(2) |
|   pps_collocated_from_l0_idc | u(2) |
|   pps_six_minus_max_num_merge_cand_plus1 | ue(v) |
|   pps_max_num_merge_cand_minus_max_num_triangle_cand_plus1 | ue(v) |
| } | |
| picture_header_extension_present_flag | u(1) |
| slice_header_extension_present_flag | u(1) |
| pps_extension_flag | u(1) |
| if( pps_extension_flag )   while( more_rbsp_data( ) )     pps_extension_data_flag | u(1) |
| rbsp_trailing_bits( ) } | |

As illustrated in Table 1, above, num_slices_in_pic_minus1 plus 1 specifies the number of rectangular slices in each picture referring to the PPS. The value of num_slices_in_pic_minus1 is in the range of 0 to MaxSlicesPerPicture−1, inclusive. When the no_pic_partition_flag is equal to 1, the value of num_slices_in_pic_minus1 may be inferred to be equal to 0.

As illustrated in Table 1, above, pps_mvd_l1_zero_idc equal to 0 specifies that the syntax element mvd_l1_zero_flag is present in PHs referring to the PPS. Also, pps_mvd_l1_zero_idc equal to 1 or 2 specifies that mvd_l1_zero_flag is not present in PHs referring to the PPS. Further, pps_mvd_l1_zero_idc equal to 3 is reserved for future use by ITU-T|ISO/IEC.

As illustrated in Table 1, above, pps_collocated_from_l0_idc equal to 0 specifies that the syntax element collocated_from_l0_flag is present in a slice header of slices referring to the PPS. Also, pps_collocated_from_l0_idc equal to 1 or 2 specifies that the syntax element collocated_from_l0_flag is not present in a slice header of slices referring to the PPS. Further, pps_collocated_from_l0_idc equal to 3 is reserved for future use by ITU-T|ISO/IEC.

As illustrated in Table 1, above, pps_six_minus_max_num_merge_cand_plus1 equal to 0 specifies that pic_six_minus_max_num_merge_cand is present in PHs referring to the PPS. Also, pps_six_minus_max_num_merge_cand_plus1 greater than 0 specifies that pic_six_minus_max_num_merge_cand is not present in PHs referring to the PPS. The value of pps_six_minus_max_num_merge_cand_plus1 is in the range of 0 to 6, inclusive.

As illustrated in Table 1, above, pps_max_num_merge_cand_minus_max_num_triangle_cand_plus1 equal to 0 specifies that pic_max_num_merge_cand_minus_max_num_triangle_cand is present in PHs of slices referring to the PPS. Also, pps_max_num_merge_cand_minus_max_num_triangle_cand_plus1 greater than 0 specifies that pic_max_num_merge_cand_minus_max_num_triangle_cand is not present in PHs referring to the PPS. The value of pps_max_num_merge_cand_minus_max_num_triangle_cand_plus1 is in the range of 0 to MaxNumMergeCand−1.

Slice Layer RBSP

A slice layer RBSP may consist of a slice header and slice data.

TABLE 2

Slice Layer RBSP.

| Syntax Element | Descriptor |
|---|---|
| slice_layer_rbsp( ) { | |
|   slice_header( ) | |
|   slice_data( ) | |
|   rbsp_slice_trailing_bits( ) | |
| } | |

Picture Header and Slice Header

Syntax elements coded in PPS, where a current picture refers to, might be overridden in PH and SH such, that a pic_deblocking_filter_override_flag in the PH, referring to the PPS, or the slice_deblocking_filter_override_flag in the SH, referring to the PPS, is set. Those syntax elements not present in PH may be present in SH instead. For instance, when the value of the pic_sao_enabled_present_flag, in PH, specifying the presence of SAO related syntax elements, is 0, slice_sao_luma_flag and slice_sao_chroma_flag may be coded in SH to indicate SAO usage on luma and chroma.

With the use of PH, syntax elements that are already constrained to be the same in all slices of a picture may be transmitted in PH once per picture to avoid signaling overhead, especially when there are a handful of slices in a picture. Still, syntax elements that often vary from slice to slice may be transmitted in SH to provide flexibility.

Syntax elements included in PH and SH in VVC Draft 7 are described in Tables 3 and 5, below.

TABLE 3

General Slice Header Syntax

| Syntax Element | Descriptor |
|---|---|
| picture_header_rbsp( ) { | |
|   non_reference_picture_flag | u(1) |
|   gdr_pic_flag | u(1) |
|   no_output_of_prior_pics_flag | u(1) |
|   if( gdr_pic_flag ) | |
|     recovery_poc_cnt | ue(v) |
|   ph_pic_parameter_set_id | ue(v) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|   if( sps_subpic_id_present_flag && !sps_subpic_id_signalling_flag ) { | |
|     ph_subpic_id_signalling_present_flag | u(1) |
|     if( ph_subpics_id_signalling_present_flag ) { | |
|       ph_subpic_id_len_minus1 | ue(v) |
|       for( i = 0; i <= sps_num_subpics_minus1; i++ ) | |
|         ph_subpic_id[ i ] | u(v) |
|     } | |
|   } | |
|   if( !sps_loop_filter_across_virtual_boundaries_disabled_present_flag ) { | |
|     ph_loop_filter_across_virtual_boundaries_disabled_present_flag | u(1) |
|     if( ph_loop_filter_across_virtual_boundaries_disabled_present_flag ) { | |
|       ph_num_ver_virtual_boundaries | u(2) |
|       for( i = 0; i < ph_num_ver_virtual_boundaries; i++ ) | |

TABLE 3-continued

General Slice Header Syntax

| Syntax Element | Descriptor |
|---|---|
|       ph_virtual_boundaries_pos_x[ i ] | u(13) |
|     ph_num_hor virtual boundaries | u(2) |
|     for( i = 0; i < ph_num_hor virtual boundaries; i++ ) | |
|       ph_virtual_boundaries_pos_y[ i ] | u(13) |
|   } | |
| } | |
| if( separate_colour_plane_flag == 1 ) | |
|   colour_plane_id | u(2) |
| if( output_flag_present_flag ) | |
|   pic_output_flag | u(1) |
| pic_rpl_present_flag | u(1) |
| if( pic_rpl_present_flag ) { | |
|   for(i = 0; i < 2; i++) { | |
|     if( num_ref_pic_lists_in_sps[ i ] > 0 && !pps_ref_pic_list_sps_idc[ i ] && (i == 0 || (i == 1 && rpl1_idx_present_flag ) ) ) | |
|     pic_rpl_sps_flag[ i ] | u(1) |
|     if( pic_rpl_sps_flag[ i ] ) { | |
|       if( num_ref_pic_lists_in_sps[ i ] > 1 && (i == 0 || (i == 1 && rpl1_idx_present_flag ) ) ) | |
|       pic_rpl_idx[ i ] | u(v) |
|     } else | |
|     ref_pic_list_struct( i, num_ref_pic_lists_in_sps[ i ] ) | |
|     for( j = 0 ;j < NumLtrpEntries[ i ][ RplsIdx[ i ] ]; j++ ) { | |
|       if( ltrp_in_slice_header_flag[ i ][ RplsIdx[ i ] ] ) | |
|       pic_poc_lsb_lt[ i ][ j ] | u(v) |
|       pic_delta poc_msb_present_flag[ i ][ j ] | u(1) |
|       if( pic_delta_poc_msb present_flag[ i ][ j ] ) | |
|       pic_delta_poc_msb_cycle_lt[ i ][ j ] | ue(v) |
|     } | |
|   } | |
| } | |
| if( partition_constraints_override_enabled_flag ) { | |
|   partition_constraints_override_flag | u(1) |
|   if( partition_constraints_override_flag ) { | |
|     pic_log2_diff_min_qt_min_cb_intra_slice_luma | ue(v) |
|     pic_log2_diff_min_qt_min_cb_inter_slice | ue(v) |
|     pic_max_mtt_hierarchy_depth_inter_slice | ue(v) |
|     pic_max_mtt_hierarchy_depth_intra_slice_luma | ue(v) |
|     if( pic_max_mtt_hierarchy_depth_intra_slice_luma != 0 ) { | |
| pic_log2_diff_max_bt_min_qt_intra_slice_luma | ue(v) |
| pic_log2_diff_max_tt_min_qt_intra_slice_luma | ue(v) |
|     } | |
|     if( pic_max_mtt_hierarchy_depth_inter_slice != 0 ) { | |
|       pic_log2_diff_max_bt_min_qt_inter_slice | ue(v) |
|       pic_log2_diff_max_tt_min_qt_inter_slice | ue(v) |
|     } | |
|     if( qtbtt_dual_tree_intra_flag ) { | |
| pic_log2_diff_min_qt_min_cb_intra_slice_chroma | ue(v) |
| pic_max_mtt_hierarchy_depth_intra_slice_chroma | ue(v) |
|     if( pic_max_mtt_hierarchy_depth_intra_slice_chroma != 0 ) { | |
| pic_log2_diff_max_bt_min_qt_intra_slice_chroma | ue(v) |
| pic_log2_diff_max_tt_min_qt_intra_slice_chroma | ue(v) |
|     } | |
|     } | |
|   } | |
| } | |
| if( cu_qp_delta_enabled_flag ) { | |
|   pic_cu_qp_delta_subdiv_intra_slice | ue(v) |
|   pic_cu_qp_delta_subdiv_inter_slice | ue(v) |
| } | |
| if( pps_cu_chroma_qp_offset_list_enabled_flag ) { | |
|   pic_cu_chroma_qp_offset_subdiv_intra_slice | ue(v) |
|   pic_cu_chroma_qp_offset_subdiv_inter_slice | ue(v) |
| } | |
| if( sps_temporal_mvp_enabled_flag ) | |
|   pic_temporal_mvp_enabled_flag | u(1) |
| if( !pps_mvd_l1_zero_idc ) | |
|   mvd_l1_zero_flag | u(1) |
| if( !pps_six_minus_max_num_merge_cand_plus1 ) | |
|   pic_six_minus_max_num_merge_cand | ue(v) |
| if( sps_affine_enabled_flag ) | |

TABLE 3-continued

General Slice Header Syntax

| Syntax Element | Descriptor |
|---|---|
|    pic_five_minus_max_num_subblock_cand | ue(v) |
|   if( sps_fpel_mmvd_enabled_flag ) | |
|    pic_fpel_mmvd_enabled_flag | u(1) |
|   if( sps_bdof_pic_present_flag ) | |
|    pic_disable_bdof_flag | u(1) |
|   if( sps_dmvr_pic_present_flag ) | |
|    pic_disable_dmvr_flag | u(1) |
|   if( sps_prof_pic_present_flag ) | |
|    pic_disable_prof_flag | u(1) |
|   if( sps_triangle_enabled_flag && MaxNumMergeCand >= 2 && | |
|   !pps_max_num_merge_cand_minus_max_num_triangle_cand_plus1 ) | |
|    pic_max_num_merge_cand_minus_max_num_triangle_cand | ue(v) |
|   if ( sps_ibc_enabled_flag ) | |
|    pic_six_minus_max_num_ibc_merge_cand | ue(v) |
|   if( sps_joint_cbcr_enabled_flag ) | |
|    pic_joint_cbcr_sign_flag | u(1) |
|   if( sps_sao_enabled_flag ) { | |
|    pic_sao_enabled_present_flag | u(1) |
|    if( pic_sao_enabled_present_flag ) { | |
|     pic_sao_luma_enabled_flag | u(1) |
|     if( ChromaArrayType != 0 ) | |
|      pic_sao_chroma_enabled_flag | u(1) |
|    } | |
|   } | |
|   if( sps_alf_enabled_flag ) { | |
|    pic_alf_enabled_present_flag | u(1) |
|    if( pic_alf_enabled_present_flag ) { | |
|     pic_alf_enabled_flag | u(1) |
|     if( pic_alf_enabled_flag ) { | |
|      pic_num_alf_aps_ids_luma | u(3) |
|      for( i = 0; i < pic_num_alf_aps_ids_luma; i++ ) | |
|       pic_alf_aps_id_luma[ i ] | u(3) |
|      if( ChromaArrayType != 0 ) | |
|       pic_alf_chroma_idc | u(2) |
|      if( pic_alf_chroma_idc ) | |
|       pic_alf_aps_id_chroma | u(3) |
|     } | |
|    } | |
|   } | |
|   if ( ! pps_dep_quant_enabled_idc ) | |
|    pic_dep_quant_enabled_flag | u(1) |
|   if( !pic_dep_quant_enabled_flag ) | |
|    sign_data_hiding_enabled_flag | u(1) |
|   if( deblocking_filter_override_enabled_flag ) { | |
|    pic_deblocking_filter_override_present_flag | u(1) |
|    if( pic_deblocking_filter_override_present_flag ) { | |
|     pic_deblocking_filter_override_flag | u(1) |
|     if( pic_deblocking_filter_override_flag ) { | |
|      pic_deblocking_filter_disabled_flag | u(1) |
|      if( !pic_deblocking_filter_disabled_flag ) { | |
|       pic_beta_offset_div2 | se(v) |
|       pic_tc_offset_div2 | |
|      } | |
|     } | |
|    } | |
|   } | se(v) |
|   if( sps_lmcs_enabled_flag ) { | |
|    pic_lmcs_enabled_flag | u(1) |
|    if( pic_lmcs_enabled_flag ) { | |
|     pic_lmcs_aps_id | u(2) |
|     if( ChromaArrayType != 0 ) | |
|      pic_chroma_residual_scale_flag | u(1) |
|    } | |
|   } | |
|   if( sps_scaling_list_enabled_flag ) { | |
|    pic_scaling_list_present_flag | u(1) |
|    if( pic_scaling_list_present_flag ) | |
|     pic_scaling_list_aps_id | u(3) |
|   } | |
|   if( picture_header_extension_present_flag ) { | |
|    ph_extension_length | ue(v) |
|    for( i = 0; i < ph_extension_length; i++ ) | |
|     ph_extension_data_byte[ i ] | u(8) |
|   } | |
|   rbsp_trailing_bits( ) | |
| } | |

TABLE 3-continued

General Slice Header Syntax

| Syntax Element | Descriptor |
|---|---|
| slice_header( ) { | |
|   slice_pic_order_cnt_lsb | u(v) |
|   if( subpics_present_flag ) | |
|     slice_subpic_id | u(v) |
|   if( rect_slice_flag \|\| NumTilesInPic > 1 ) | |
|     slice_address | u(v) |
|   if( !rect_slice_flag && NumTilesInPic > 1 ) | |
|     num_tiles_in_slice_minus1 | ue(v) |
|   slice_type | ue(v) |
|   if( !pic_rpl_present_flag &&( ( nal_unit_type != IDR_W_RADL && nal_unit_type != | |
|         IDR_N_LP ) \|\| sps_idr_rpl_present_flag ) ) { | |
|     for(i = 0; i < 2; i++ ) { | |
|       if( num_ref_pic_lists_in_sps[ i ] > 0 && !pps_ref_pic_list_sps_idc[ i ] && | |
|             (i == 0 \|\| (i == 1&& rpl1_idx_present_flag ) ) ) | |
|         slice_rpl_sps_flag[ i ] | u(1) |
|       if( slice_rpl_sps_flag[ i ] ) { | |
|         if( num_ref_pic_lists_in_sps[ i ] > 1 && (i == 0 \|\| (i == 1 && rpl1_idx_present_flag ) ) ) | |
|           slice_rpl_idx[ i ] | u(v) |
|       } else | |
|         ref_pic_list_struct( i, num_ref_pic_lists_in_sps[ i ] ) | |
|       for(j = 0; j < NumLtrpEntries[ i ][ RplsIdx[ i ] ]; j++ ) { | |
|         if( 1trp_in_slice_header_flag[ i ][ RplsIdx[ i ] ] ) | |
|           slice_poc_lsb_lt[ i ][ j ] | u(v) |
|         slice_delta_poc_msb_present_flag[ i ][ j ] | u(1) |
|         if( slice_delta_poc_msb_present_flag[ i ][ j ] ) | |
|           slice_delta_poc_msb_cycle_lt[ i ][ j ] | ue(v) |
|       } | |
|     } | |
|   } | |
|   if( pic_rpl_present_flag \|\| ( ( nal_unit_type != IDR W_RADL && nal_unit_type != | |
|         IDR N LP ) \|\| sps_idr_rpl_present_flag ) ) { | |
|     if( ( slice_type != I && num_ref_entries[ 0 ][ RplsIdx[ 0] ] > 1 ) \|\| | |
|       ( slice_type == B && num_ref_entries[ 1 ][ RplsIdx[ 1 ] ] >1 ) ) { | |
|       num_ref_idx_active_override_flag | u(1) |
|       if( num_ref_idx active_override_flag ) | |
|         for( i = 0; i < (slice_type == B?2: 1 ); i++ ) | |
|           if( num_ref_entries[ i ][ RplsIdx[ i ] ] > 1 ) | |
|             num_ref_idx_active_minus1[ i ] | ue(v) |
|     } | |
|   } | |
|   if( slice_type != I ) { | |
|     if( cabac_init_present_flag ) | |
|       cabac_init_flag | u(1) |
|     if( pic_temporal_mvp_enabled_flag ) { | |
|       if( slice_type == B && !pps_collocated_from_l0_idc ) | |
|         collocated_from_l0_flag | u(1) |
|       if( ( collocated_from_l0_flag && NumRefIdxActive[ 0 ] > 1 ) \|\| | |
|         ( !collocated_from_l0_flag && NumRefIdxActive[ 1 ] > 1 ) ) | |
|         collocated_ref_idx | ue(v) |
|     } | |
|     if( ( pps_weighted_pred_flag && slice_type == P ) \|\| | |
|       ( pps_weighted_bipred_flag && slice_type == B ) ) | |
|       pred_weight_table( ) | |
|   } | |
|   slice_qp_delta | se(v) |
|   if( pps_slice_chroma_qp_offsets_present_flag ) { | |
|     slice_cb_qp_offset | se(v) |
|     slice_cr_qp_offset | se(v) |
|     if( sps_joint_cbcr_enabled_flag ) | |
|       slice_joint_cbcr_qp_offset | se(v) |
|   } | |
|   if( pps_cu_chroma_qp_offset_list_enabled_flag ) | |
|     cu_chroma_qp_offset_enabled_flag | u(1) |

TABLE 3-continued

General Slice Header Syntax

| Syntax Element | Descriptor |
|---|---|
| if( sps_sao_enabled_flag && !pic_sao_enabled_present_flag ) { | |
|   slice_sao_luma_flag | u(1) |
|   if( ChromaArrayType != 0 ) | |
|     slice_sao_chroma_flag | u(1) |
| } | |
| if( sps_alf_enabled_flag && !pic_alf_enabled_present_flag ) { | |
|   slice_alf_enabled_flag | u(1) |
|   if( slice_alf_enabled_flag ) { | |
|     slice_num_alf_aps_ids_luma | u(3) |
|     for( i = 0; i < slice_num_alf_aps_ids_luma; i++ ) | |
|       slice_alf_aps_id_luma[ i ] | u(3) |
|     if( ChromaArrayType != 0 ) | |
|       slice_alf_chroma_idc | u(2) |
|     if( slice_alf_chroma_idc ) | |
|       slice_alf_aps_id_chroma | u(3) |
|   } | |
| } | |
| if( deblocking_filter_override_enabled_flag && !pic_deblocking_filter_override_present_flag ) | |
|   slice_deblocking_filter_override_flag | u(1) |
| if( slice_deblocking_filter_override_flag ) { | |
|   slice_deblocking_filter_disabled_flag | u(1) |
|   if( !slice_deblocking_filter_disabled_flag ) { | |
|     slice_beta_offset_div2 | se(v) |
|     slice_tc_offset_div2 | se(v) |
|   } | |
| } | |
| if( entry_point_offsets_present_flag && NumEntryPoints > 0 ) { | |
|   offset_len_minus1 | ue(v) |
|   for( i = 0; i < NumEntryPoints; i++ ) | |
|     entry_point_offset_minus1[ i ] | u(v) |
| } | |
| if( slice_header_extension_present_flag ) { | |
|   slice_header_extension_length | ue(v) |
|   for( i = 0; i < slice_header_extension_length; i++ ) | |
|     slice_header_extension_data_byte[ i ] | u(8) |
| } | |
| byte_alignment( ) | |
| } | |

As indicated above and below, slice_type may specify the coding type of the slice according to Table 4, below:

TABLE 4 slice_type

| slice_type | Name of slice_type |
|---|---|
| 0 | B (B slice) |
| 1 | P (P slice_) |
| 2 | I (I slice_) |

Access Unit Delimiter

An AU (Access Unit) delimiter is used to indicate the start of an AU and the type of slices present in coded pictures in the AU containing the AU delimiter NAL (Network Abstraction Layer) unit. Presently, there is no normative decoding process associated with the AU delimiter.

Also, pic_type indicates that the slice_type values for all slices of coded pictures in the AU containing the AU delimiter NAL unit are members of the set listed in Table 4 for the given value of pic_type. The value of pic_type may be equal to 0, 1 or 2 in bitstreams. Other values of pic_type are reserved for future use by ITU-T|ISO/IEC. Decoders conforming to this version of this may ignore reserved values of pic_type.

TABLE 5

Interpretation of pic_type

| pic_type | slice_type values that may be present in the AU |
|---|---|
| 0 | I |
| 1 | P, I |
| 2 | B, P, I |

Non-patent literature [1] ("NPL 1") proposes a high-level control flag to indicate that a set of parameters are needed for covered low-level coding layers.

NPL 1 describes a method wherein all inter-prediction related syntax elements or parameters only need to be signaled when there is at least one inter coded slice, or when a sub-partition exists inside a picture. Otherwise, those syntax elements or parameter are not signaled.

In one embodiment described in NPL 1, a control flag in a picture header, referred to as pic_intra_only_flag, is signaled to indicate if all slices (or any kind of sub-partitions of this picture) inside the picture will have intra prediction (or non-inter related prediction) only. When this flag is true, only intra coding related syntax elements or parameters are signaled later in the picture header. Otherwise, when this flag is false, inter prediction related syntax elements or parameters are signaled. A syntax table reflecting this embodiment is provided below:

TABLE 6

| First Embodiment of NPL 1 | |
| --- | --- |
| Syntax Element | Descriptor |
| pic_intra_only_flag<br>if(!pic_intra_only_flag){<br>    if( sps_temporal__mvp_enabled_flag<br>&& !pps_temporal__mvp_enabled_idc )<br>        pic_temporal__mvp_enabled_flag<br>    if(!pps_mvd_l1_zero_idc )<br>        mvd_l1_zero_flag<br>    if( !pps_six_minus_max_num_merge_cand_plus1 )<br>        pic_six_minus_max_num_merge_cand<br>    if( sps_affine_enabled_flag &&<br>!pps_five_minus_max_num_subblock_merge_cand_plus1 )<br>        pic_five_minus_max_num_subblock_merge_cand<br>    if( sps_fpel_mmvd_enabled_flag )<br>        pic_fpel_mmvd_enabled_flag<br>    if( sps_bdof_dmvr_slice_present_flag )<br>        pic_disable_bdof_dmvr_flag<br>    if( sps_triangle_enabled_flag && MaxNumMergeCand > = 2 &&<br>!pps_max_num_merge_cand_minus_max_num_triangle_cand_minus<br>1 )<br>        pic_max_num_merge_cand_minus_max_num_triangle_cand<br>} | u(1)<br><br><br><br>u(1)<br><br><br>u(1)<br><br>ue(v)<br><br><br><br>ue(v)<br><br><br>u(1)<br><br>u(1)<br><br><br><br><br>ue(v) |

In another method of NPL 1, all related syntax elements or parameters that are used only for intra slice or intra sub-partition need to be signaled when there is no inter coded slice or when a sub-partition exists inside the picture. Otherwise, those syntax elements or parameter are not signaled.

In another embodiment of NPL 1, a control flag in picture header, referred as pic_inter_only_flag, is signaled to indicate if all the slices (or any kind of sub-partition of this picture) inside the picture will have inter prediction (or non-intra related prediction). When this flag is true, intra slice related syntax elements or parameters are not signaled later in the picture header. Otherwise, when this flag is false, intra slice may be used in at least one of the slice(s) or sub-partition(s) in the picture. The related syntax elements or parameters for intra slice or sub-partitions will be signaled. A syntax table reflecting this embodiment is provided below:

TABLE 7

| Second Embodiment of NPL 1 | |
| --- | --- |
| Syntax Element | Descriptor |
| pic_inter_only_flag<br>if(!pic_inter_only_flag){<br>    if( qtbtt_dual_tree_intra_flag ) {<br>        ifpic_log2_diff_min_qt_min_cb_chroma<br>        ifpic_max_mtt_hierarchy_depth_chroma<br>        if( pic_max_mtt_hierarchy_depth_chroma<br>!=<br>0 ) {<br>        pic_log2_diff_max_bt_min_qt_chroma<br>        pic_log2_diff_max_tt_min_qt_chroma<br>        }<br>    }<br>} | u(1)<br><br><br>ue(v)<br>ue(v)<br><br><br><br><br>ue(v)<br>ue(v) |

In the above methods described in NPL 1, if a picture has its own type, such as being an intra picture or inter picture, the above control flags pic_intra_only_flag and pic_inter_only_flag need not be signaled, and their values can be derived from the picture type.

Also, if current picture has a picture type as intra-only picture (all slices in the picture are I slices), then a pic_intra_only_flag may be inferred as true. In another example, if the current picture has a picture type as inter-only picture (all slices in the picture are P or B slices), the pic_inter_only_flag may be inferred as true. In yet another example in NPL 1, if a current picture has a picture type indicating both intra-slices and inter-slices are possible in the picture, both the pic_intra_only_flag and the pic_inter_only_flag can be inferred as false.

Problem

Although PH may be signalled once per picture to avoid signalling syntax elements that are common to slices within a picture, this signalling may introduce overhead instead, without considering syntax elements only used for intra slices (I slices) or inter slices (B, P slices).

SUMMARY

Embodiments relate to a method, system, and computer readable medium for video encoding/decoding, and more specifically to picture header handling.

BRIEF DESCRIPTION OF THE DRAWINGS

These and other objects, features and advantages will become apparent from the following detailed description of illustrative embodiments, which are to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
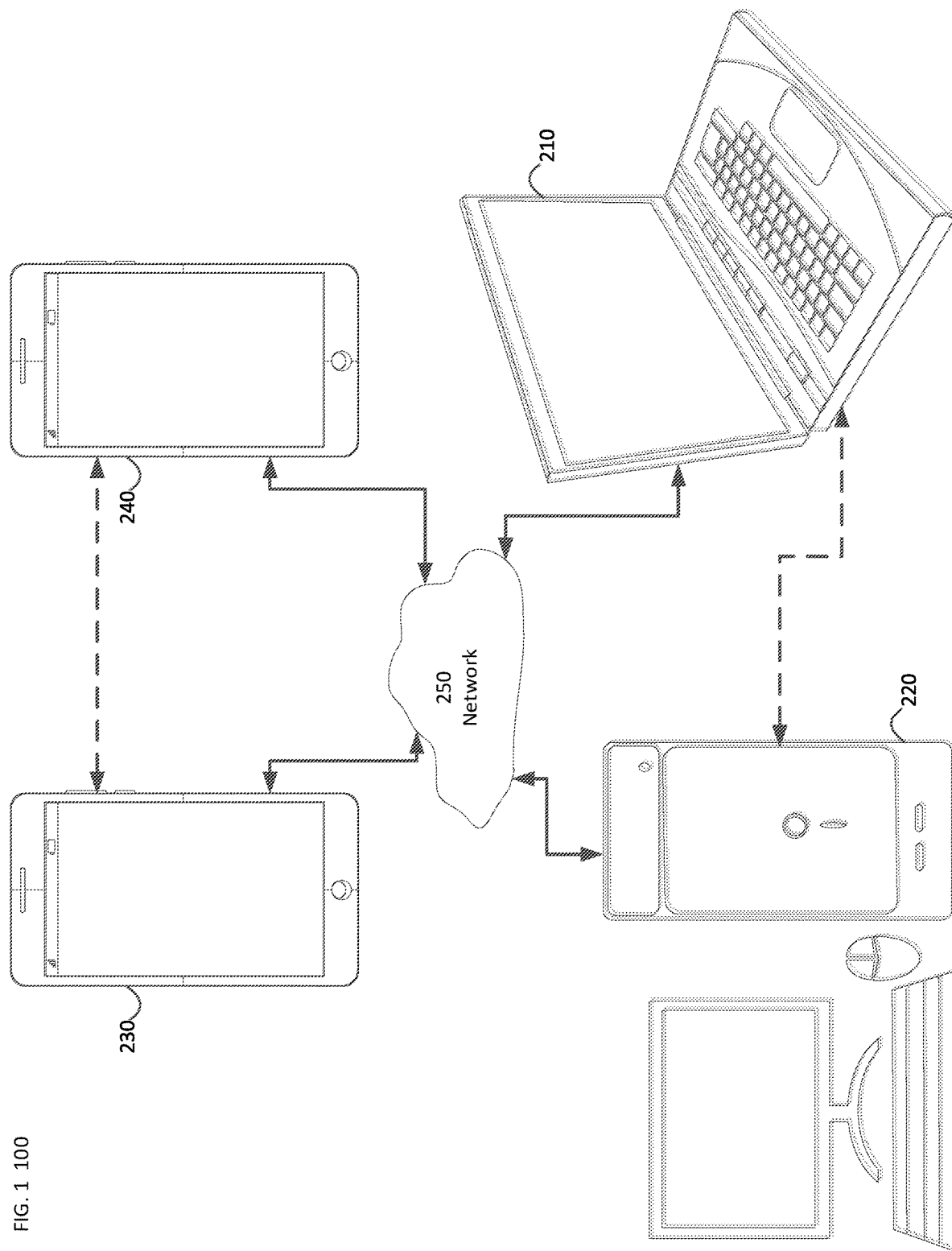
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110-120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
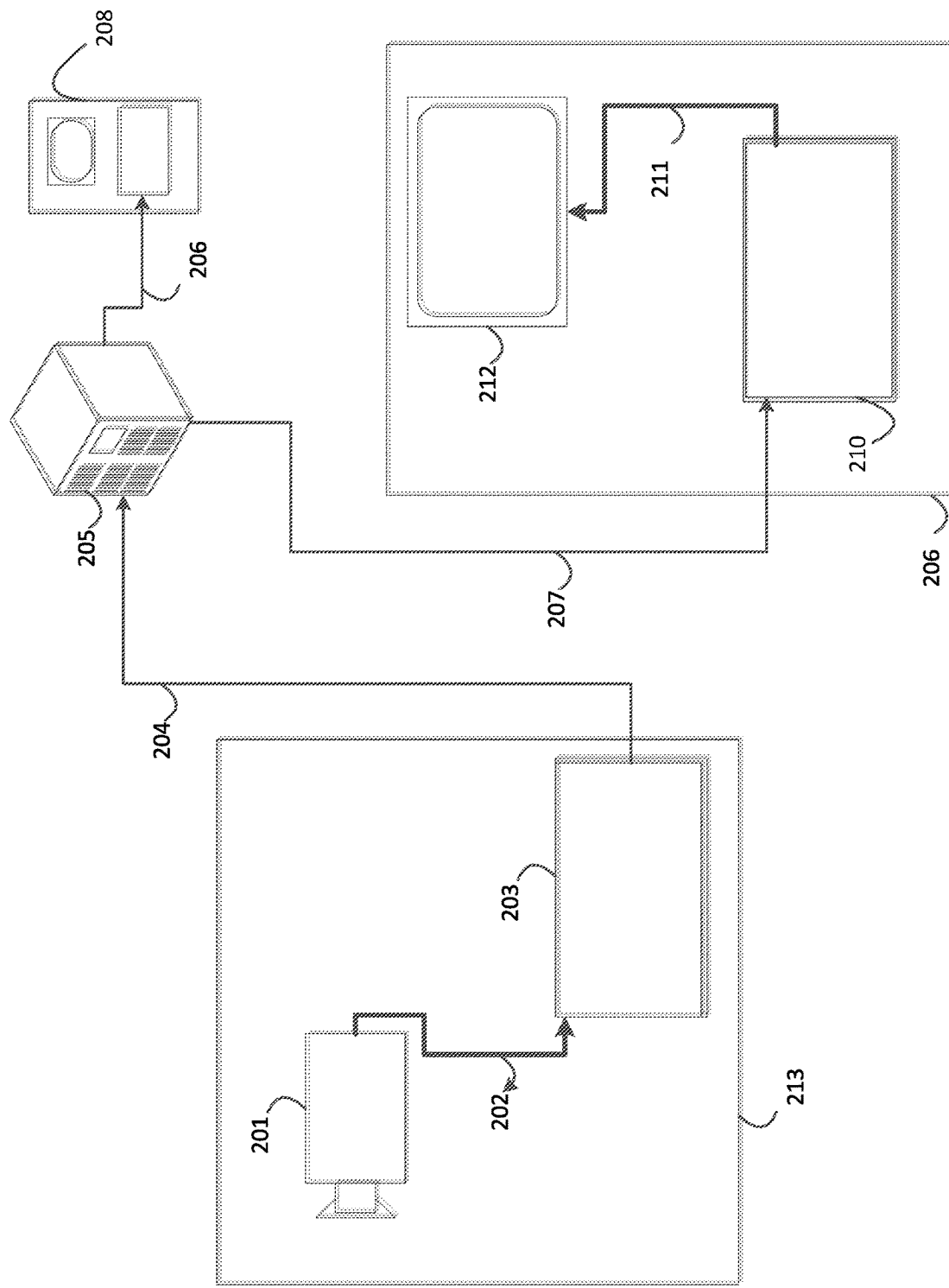
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating a for example uncompressed video sample stream (202). That sample stream (202), depicted as a bold line to emphasize a high data volume when compared to encoded video bitstreams, can be processed by an encoder (203) coupled to the camera (201). The encoder (203) can include hardware, software, or a combination thereof to enable or implement aspects of the disclosed subject matter as described in more detail below. The encoded video bitstream (204), depicted as a thin line to emphasize the lower data volume when compared to the sample stream, can be stored on a streaming server (205) for future use. One or more streaming clients (206, 208) can access the streaming server (205) to retrieve copies (207, 209) of the encoded video bitstream (204). A client (206) can include a video decoder (210) which decodes the incoming copy of the encoded video bitstream (207) and creates an outgoing video sample stream (211) that can be rendered on a display (212) or other rendering device (not depicted). In some streaming systems, the video bitstreams (204, 207, 209) can be encoded according to certain video coding/compression standards. Examples of those standards include ITU-T Recommendation H.265. Under development is a video coding standard informally known as Versatile Video Coding or VVC. The disclosed subject matter may be used in the context of VVC.

In embodiments, the syntax element pic_type_idc may be used to indicate the slice types for all slices of a coded picture.

In one embodiment, pic_type_idc may be coded using an unsigned integer 0-th order Exp-Golomb-coded syntax element with the left bit first. Here, pic_type_idc may have three value 0, 1 and 2, and three statuses such as I slice only, B, P, I slices, and B, P slices. The value may be mapped to statuses in any order. Table 8, below shows examples of possible pic_type_idc semantics.

TABLE 8

Example of Possible pic_type_idc Semantics

| pic_type_idc | slice_type that present in_a coded picture |
|---|---|
| 0 | B, P, I |
| 1 | I |
| 2 | B, P |

In an embodiment, pic_type_idc may be coded using an unsigned integer using 2 bits. Here, pic_type_idc may have, but is not necessarily limited to three values 0, 1 and 2, and three statuses, such as: I slice only, B, P, I slices, and B, P slices. Other values of pic_type_idc may be reserved for further definition.

TABLE 9

Examples of Possible pic_type_idc Semantics

| pic_type_idc | slice_type that present in_a coded picture |
|---|---|
| 0 | B, P, I |
| 1 | I |
| 2 | B, P |
| 3 | reserved |

In an embodiment, the reserved pic_type_idc value 3 may indicate only P, I slices present in a coded picture.

In an example, pic_type_idc may be coded using an unsigned integer using 2 bits. Also, pic_type_idc may have four value 0, 1, 2 and 3, and four statuses such as I slice only, B, P, I slices and B slices, and P slices.

TABLE 10

Examples of Possible pic_type_idc Semantics

| pic_type_idc | slice_type that present in_a coded picture |
|---|---|
| 0 | B, P, I |
| 1 | I |
| 2 | B |
| 3 | P |

It is proposed to signal pic_type_idc in HLS, such that only related syntax elements are coded or present to reduce signaling overhead. For example, when pic_type_idc indicating the picture is intra only, no inter related syntax elements are signaled.

In one example, pic_type_idc may be signaled in PPS such that it specifies the slice types for all slices of each coded picture referring to the PPS. Detailed syntax and semantics are given as follow. In the below Table, as well as other Tables in this disclosure, changes compared to VVC Draft 7 are italicized.

TABLE 11

Detailed Syntax and Semantics

| Syntax Element | Descriptor |
|---|---|
| pic_parameter_set_rbsp( ) { | |
|   pps_pic_parameter_set_id | ue(v) |
|   pps_seq_parameter_set_id | u(4) |
|   pic_width_in_luma_samples | ue(v) |
|   pic_height_in_luma_samples | ue(v) |
|   *pic_type_idc* | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   scaling_window_flag | u(1) |
|   if( scaling_window_flag ) { | |
|     scaling_win_left_offset | ue(v) |
|     scaling_win_right_offset | ue(v) |
|     scaling_win_top_offset | ue(v) |
|     scaling_win_bottom_offset | ue(v) |
|   } | |
|   output_flag_present_flag | u(1) |
|   mixed_nalu_types_in_pic_flag | u(1) |
|   pps_subpic_id_signalling_present_flag | u(1) |
|   if( pps_subpics_id_signalling_present_flag ) { | |
|     pps_num_subpics_minus1 | ue(v) |
|     pps_subpic_id_len_minus1 | ue(v) |
|     for( i = 0; i <= pps_num_subpic_minus1; i++ ) | |
|       pps_subpic_id[ i ] | u(v) |
|   } | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     rect_slice_flag | u(1) |
|     if( rect_slice_flag ) | |
|       single_slice_per_subpic_flag | u(1) |
|     if( rect_slice_flag && !single_slice_per_subpic_flag ) { | |
|       num_slices_in_pic_minus1 | ue(v) |
|       tile_idx_delta_present_flag | u(1) |
|       for( i = 0; i < num_slices_in_pic_minus1; i++ ) { | |
|         slice_width_in_tiles_minus1[ i ] | ue(v) |
|         slice_height_in_tiles_minus1[ i ] | ue(v) |
|         if( slice_width_in_tiles_minus1[ i ] = = 0 && slice_height_in_tiles_minus1[ i ] = = 0 ) { | |
|           num_slices_in_tile_minus1[i ] | ue(v) |
|           num_SlicesInTileMinus1 = num_slices_in_tile_minus1[ i ] | |
|           for(j = 0; j < numSlicesInTileMinus1; j++ ) | |
|         slice_height_in_ctu_minus1[ i++] | ue(v) |
|         } | |
|         if( tile_idx_delta_present_flag && i< num_slices_in_pic_minus1 ) | |
|           tile_idx_delta[ i ] | se(v) |
|       } | |
|     } | |
|     loop_filter_across_tiles_enabled_flag | u(1) |
|     loop_filter_across_slices_enabled_flag | u(1) |
|   } | |
|   entropy_coding_sync_enabled_flag | u(1) |
|   if( !no_pic_partition_flag || entropy_coding_sync_enabled_flag ) | |
|     entry_point_offsets_present_flag | u(1) |
|   cabac_init_present_flag | u(1) |
|   for( i = 0; i < 2; i++ ) | |
|     num_ref_idx_default_active_minus1[ i ] | ue(v) |

TABLE 11-continued

Detailed Syntax and Semantics

| Syntax Element | Descriptor |
|---|---|
| rpl1_idx_present_flag | u(1) |
| init_qp_minus26 | se(v) |
| log2_transform_skip_max_size_minus2 | ue(v) |
| cu_qp_delta_enabled_flag | u(1) |
| pps_cb_qp_offset | se(v) |
| pps_cr_qp_offset | se(v) |
| pps_joint_cbcr_qp_offset_present_flag | u(1) |
| if( pps_joint_cbcr_qp_offset_present_flag ) | |
|    pps_joint_cbcr_qp_offset_value | se(v) |
| pps_slice_chroma_qp_offsets_present_flag | u(1) |
| pps_cu_chroma_qp_offset_list_enabled_flag | u(1) |
| if( pps_cu_chroma_qp_offset_list_enabled_flag ) { | |
|    chroma_qp_offset_list_len_minus1 | ue(v) |
|    for( i = 0; i <= chroma_qp_offset_list_len_minus1; i++ ) { | |
|      cb_qp_offset_list[ i ] | se(v) |
|      cr_qp_offset_list[ i ] | se(v) |
|      if( pps_joint_cbcr_qp_offset_present_flag ) | |
|        joint_cbcr_qp_offset_list[ i ] | se(v) |
|    } | |
| } | |
| pps_weighted_pred_flag | u(1) |
| pps_weighted_bipred_flag | u(1) |
| deblocking_filter_control_present_flag | u(1) |
| if( deblocking_filter_control_present_flag ) { | |
|    deblocking_filter_override_enabled_flag | u(1) |
|    pps_deblocking_filter_disabled_flag | u(1) |
|    if( !pps_deblocking_filter_disabled_flag ) { | |
|      pps_beta_offset_div2 | se(v) |
|      pps_tc_offset_div2 | se(v) |
|    } | |
| } | |
| constant_slice_header_params_enabled_flag | u(1) |
| if( constant_slice_header_params_enabled_flag ) { | |
|    pps_dep_quant_enabled_idc | u(2) |
|    for(i = 0; i < 2; i++ ) | |
|      pps_ref_pic_list_sps_idc[ i ] | (2) |
|    if (pic_type_idc != 1) { | |
|    pps_mvd_l1_zero_idc | u(2) |
|    pps_collocated_from_l0_idc | u(2) |
|    pps_six_minus_max_num_merge_cand_plus1 | ue(v) |
|    pps_max_num_merge_cand_minus_max_num_triangle_cand_plus1 | ue(v) |
|    } | |
| } | |
| picture_header_extension_present_flag | u(1) |
| slice_header_extension_present_flag | u(1) |
| pps_extension_flag | u(1) |
| if( pps_extension_flag ) | |
|    while( more_rbsp_data( ) ) | |
|      pps_extension_data_flag | u(1) |
| rbsp_trailing_bits( ) | |
| } | |

Here, pic_type_idc specifies the slice types for all slices of each coded picture referring to the PPS.

In one embodiment, pic_type_idc set equal to 1 indicates each coded picture referring to the PPS has only one or more I slices. In such cases, inter slices (B, P slice) related to syntax elements pps_mvd_l1_zero_idc, pps_collocated_from_l0_idc, pps_six_minus_max_num_merge_cand_plus1 and pps_max_num_merge_cand_minus_max_num_triangle_cand_plus1 are inferred to be equal to 0.

Here, pps_mvd_l1_zero_idc equal to 0 specifies that the syntax element mvd_l1_zero_flag is present in PHs referring to the PPS. Also, pps_mvd_l1_zero_idc equal to 1 or 2 specifies that mvd_l1_zero_flag is not present in PHs referring to the PPS. Further, pps_mvd_l1_zero_idc equal to 3 is reserved for future use by ITU-T|ISO/IEC. When not present, pps_mvd_l1_zero_idc may be inferred to be 0.

Additionally, pps_collocated_from_l0_idc equal to 0 specifies that the syntax element collocated_from_l0_flag is present in a slice header of slices referring to the PPS. Also, pps_collocated_from_l0_idc equal to 1 or 2 specifies that the syntax element collocated_from_l0_flag is not present in a slice header of slices referring to the PPS. Further, pps_collocated_from_l0_idc equal to 3 is reserved for future use by ITU-T|ISO/IEC. When not present, pps_collocated_from_l0_idc may be inferred to be equal to 0.

Also, pps_six_minus_max_num_merge_cand_plus1 equal to 0 specifies that pic_six_minus_max_num_merge_cand is present in PHs referring to the PPS. Additionally, pps_six_minus_max_num_merge_cand_plus1 greater than 0 specifies that pic_six_minus_max_num_merge_cand is not present in PHs referring to the PPS. The value of pps_six_minus_max_num_merge_cand_plus1 is be in the range of 0 to 6, inclusive. When not present, pps_six_minus_max_num_merge_cand_plus1 can be inferred to be equal to 0

As illustrated, pps_max_num_merge_cand_minus_max_num_triangle_cand_plus1 equal to 0 specifies that pic_max_num_merge_cand_minus_max_num_triangle_cand is present in PHs of slices referring to the PPS. Also, pps_max_num_merge_cand_minus_max_num_triangle_cand_plus1 greater than 0 specifies that pic_max_num_merge_cand_minus_max_num_triangle_cand is not present in PHs referring to the PPS. The value of pps_max_num_merge_cand_minus_max_num_triangle_cand_plus1 is in the range of 0 to MaxNumMergeCand−1. When not present, pps_max_num_merge_cand_minus_max_num_triangle_cand_plus1 can be inferred to be equal to 0.

TABLE 12

| Proposed Picture Header RBSP syntax | |
|---|---|
| Syntax Element | Descriptor |
| picture_header_rbsp( ) { | |
|   non_reference_picture_flag | u(1) |
|   gdr_pic_flag | u(1) |
|   no_output_of_prior_pics_flag | u(1) |
|   if( gdr_pic_flag ) | |
|     recovery_poc_cnt | ue(v) |
|   ph_pic_parameter_set_id | ue(v) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|   if( sps_subpic_id_present_flag | |
| && !sps_subpic_id_signalling_flag ) { | |
|     ph_subpic_id_signalling_present_flag | u(1) |
|     if( ph_subpics_id_signalling_present_flag ) { | |
|       ph_subpic_id_len_minus1 | ue(v) |
|       for( i = 0; i <= sps_num_subpics_minus1; i++ ) | |
|         ph_subpic_id[ i ] | u(v) |
|     } | |
|   } | |
|   if( !sps_loop_filter_across_virtual_boundaries_disabled_present_flag ) { | |
|     ph_loop_filter_across_virtual_boundaries_disabled_present_flag | u(1) |
|     if( ph_loop_filter_across_virtual_boundaries_disabled_present_flag ) { | |
|       ph_num_ver_virtual_boundaries | u(2) |
|       for( i = 0; i < ph_num_ver_virtual_boundaries; i++ ) | |
|         ph_virtual_boundaries_pos_x[ i ] | u(13) |
|       ph_num_hor_virtual_boundaries | u(2) |
|       for( i = 0; i < ph_num_hor_virtual_boundaries; i++ ) | |
|         ph_virtual_boundaries_pos_y[ i ] | u(13) |
|     } | |
|   } | |
|   if( separate_colour_plane_flag == 1 ) | |
|     colour_plane_id | u(2) |
|   if( output_flag_present_flag ) | |
|     pic_output_flag | u(1) |
|   pic_rpl_present_flag | u(1) |
|   if( pic_rpl_present_flag ) { | |
|     for(i = 0; i < 2; i++) { | |
|       if( num_ref_pic_lists_in_sps[ i ] > 0 | |
| && !pps_ref_pic_list_sps_idc[ i ] && | |
|         ( i == 0 | | (i == 1 && | |
| rpl1_idx_present_flag ) ) ) | |
|         pic_rpl_sps_flag[ i ] | u(1) |
|       if( pic_rpl_sps_flag[ i ] ) { | |
|         if( num_ref_pic_lists_in_sps[ i ] > 1 && | |
|           (i == 0 | | (i == 1 && rpl1_idx_present_flag ) ) ) | |
|           pic_rpl_idx[ i ] | u(v) |
|       } else | |
|         ref_pic_list_struct(i, num_ref_pic_lists_in_sps[ i ] ) | |
|       for( j = 0; j < NumLtrpEntries[ i ][ RplsIdx[ i ] ]; j++ ) { | |
|         if( ltrp_in_slice_header_flag[ i ][ RplsIdx[ i ] ] ) | |
|           pic_poc_lsb_lt[ i ][ j ] | u(v) |
|         pic_delta_poc_msb_present_flag[ i ][ j ] | u(1) |
|         if( pic_delta_poc_msb_present_flag[ i ][j ] ) | |
|           pic_delta_poc_msb_cycle_lt[ i ][ j ] | ue(v) |
|       } | |
|     } | |
|   } | |

TABLE 12-continued

Proposed Picture Header RBSP syntax

| Syntax Element | Descriptor |
|---|---|
| if( partition_constraints_override_enabled_flag ) { | |
|   partition_constraints_override_flag | u(1) |
|   if( partition_constraints_override_flag ) { | |
|     *if(pic_type_idc != 2) {* | |
|   pic_log2_diff_min_qt_min_cb_intra_slice_luma | ue(v) |
|     *pic_log2_diff_min_qt_min_cb_inter_slice* | ue(v) |
|     *pic_max_mtt_hierarchy_depth_inter_slice* | ue(v) |
|   pic_max_mtt_hierarchy_depth_intra_slice_luma | ue(v) |
|   if( pic_max_mtt_hierarchy_depth_intra_slice_luma != 0 ) { | |
|   pic_log2_diff_max_bt_min_qt_intra_slice_luma | ue(v) |
|   pic_log2_diff_max_tt_min_qt_intra_slice_luma | ue(v) |
|   } | |
|     *if( pic_max_mtt_hierarchy_depth_inter_slice != 0 ) {* | |
|       *pic_log2_diff_max_bt_min_qt_inter_slice* | ue(v) |
|       *pic_log2_diff_max_tt_min_qt_inter_slice* | ue(v) |
|     } | |
|     if( qtbtt_dual_tree_intra_flag ) { | |
|   pic_log2_diff_min_qt_min_cb_intra_slice_chroma | ue(v) |
|   pic_max_mtt_hierarchy_depth_intra_slice_chroma | ue(v) |
|   if( pic_max_mtt_hierarchy_depth_intra_slice_chroma != 0 ) { | |
|   pic_log2_diff_max_bt_min_qt_intra_slice_chroma | ue(v) |
|   pic_log2_diff_max_tt_min_qt_intra_slice_chroma | ue(v) |
|   } | |
|   } | |
| } | |
|   *if (pic_type_idc != 1) {* | |
|     *pic_log2_diff_min_qt_min_cb_inter_slice* | |
| pic_max_mtt_hierarchy_depth_inter_slice | |
| if( pic_max_mtt_hierarchy_depth_inter_slice != 0 ) { | |
|   pic_log2_diff_max_bt_min_qt_inter_slice | ue(v) |
|   pic_log2_diff_max_tt_min_qt_inter_slice | ue(v) |
|   } | |
|   } | |
| } | |
| } | |
| if( cu_qp_delta_enabled_flag ) { | |
|   *if (pic_type_idc != 2)* | |
|     pic_cu_qp_delta_subdiv_intra_slice | ue(v) |
|   *if (pic_type_idc != 1)* | |
|     pic_cu_qp_delta_subdiv_inter_slice | ue(v) |
| } | |
| if( pps_cu_chroma_qp_offset_list_enabled_flag ) { | |
|   *if (pic_type_idc != 2)* | |
|     pic_cu_chroma_qp_offset_subdiv_intra_slice | ue(v) |
|   *if (pic_type_idc != 1)* | |
|     pic_cu_chroma_qp_offset_subdiv_inter_slice | ue(v) |
| } | |
| *if (pic_type_idc != 1) {* | |
|   if( sps_temporal_mvp_enabled_flag ) | |
|     pic_temporal_mvp_enabled_flag | u(1) |
|   if(!pps_mvd_l1_zero_idc ) | |
|     mvd_l1_zero_flag | u(1) |
|   if( !pps_six_minus_max_num_merge_cand_plus1 ) | |
|     pic_six_minus_max_num_merge_cand | ue(v) |
|   if( sps_affine_enabled_flag ) | |
|     pic_five_minus_max_num_subblock_merge_cand | ue(v) |
|   if( sps_fpel_mmvd_enabled_flag ) | |
|     pic_fpel_mmvd_enabled_flag | u(1) |
|   if( sps_bdof_pic_present_flag ) | |
|     pic_disable_bdof_flag | u(1) |
|   if( sps_dmvr_pic_present_flag ) | |
|     pic_disable_dmvr_flag | u(1) |
|   if( sps_prof_pic_present_flag ) | |
|     pic_disable_prof_flag | u(1) |
|   if( sps_triangle_enabled_flag && MaxNumMergeCand >= 2 && !pps_max_num_merge_cand_minus_max_num_triangle_cand_plus1 ) | |
|     pic_max_num_merge_cand_minus_max_num_triangle_cand | ue(v) |
| } | |
| if ( sps_ibc_enabled_flag ) | |
|   pic_six_minus_max_num_ibc_merge_cand | ue(v) |
| if( sps_joint_cbcr_enabled_flag ) | |
|   pic_joint_cbcr_sign_flag | u(1) |
| if( sps_sao_enabled_flag ) { | |
|   pic_sao_enabled_present_flag | u(1) |

TABLE 12-continued

Proposed Picture Header RBSP syntax

| Syntax Element | Descriptor |
|---|---|
| if( pic_sao_enabled_present_flag ) { | |
|     pic_sao_luma_enabled_flag | u(1) |
|     if(ChromaArrayType != 0 ) | |
|         pic_sao_chroma_enabled_flag | u(1) |
|     } | |
| } | |
| if( sps_alf_enabled_flag ) { | |
|     pic_alf_enabled_present_flag | u(1) |
|     if( pic_alf_enabled_present_flag ) { | |
|         pic_alf_enabled_flag | u(1) |
|         if( pic_alf_enabled_flag ) { | |
|             pic_num_alf_aps_ids_luma | u(3) |
|             for( i = 0; i < pic_num_alf_aps_ids_luma; i++ ) | |
|                 pic_alf_aps_id_luma[ i ] | u(3) |
|             if( ChromaArrayType != 0 ) | |
|                 pic_alf_chroma_idc | u(2) |
|             if( pic_alf_chroma_idc ) | |
|                 pic_alf_aps_id_chroma | u(3) |
|         } | |
|     } | |
| } | |
| if ( !pps_dep_quant_enabled_idc ) | |
|     pic_dep_quant_enabled_flag | u(1) |
| if( !pic_dep_quant_enabled_flag ) | |
|     sign_data_hiding_enabled_flag | u(1) |
| if( deblocking_filter_override_enabled_flag ) { | |
|     pic_deblocking_filter_override_present_flag | u(1) |
|     if( pic_deblocking_filter_override_present_flag ) { | |
|         pic_deblocking_filter_override_flag | u(1) |
|         if( pic_deblocking_filter_override_flag ) { | |
|             pic_deblocking_filter_disabled_flag | u(1) |
|             if( !pic_deblocking_filter_disabled_flag ) { | |
|                 pic_beta_offset_div2 | se(v) |
|                 pic_tc_offset_div2 | se(v) |
|             } | |
|         } | |
|     } | |
| } | |
| if( sps_lmcs_enabled_flag ) { | |
|     pic_lmcs_enabled_flag | u(1) |
|     if( pic_lmcs_enabled_flag ) { | |
|         pic_lmcs_aps_id | u(2) |
|         if( ChromaArrayType != 0 ) | |
|             pic_chroma_residual_scale_flag | u(1) |
|     } | |
| } | |
| if( sps_scaling_list_enabled_flag ) { | |
|     pic_scaling_list_present_flag | u(1) |
|     if( pic_scaling_list_present_flag ) | |
|         pic_scaling_list_aps_id | u(3) |
| } | |
| if( picture_header_extension_present_flag ) { | |
|     ph_extension_length | ue(v) |
|     for( i = 0; i < ph_extension_length; i++ ) | |
|         ph_extension_data_byte[ i ] | u(8) |
| } | |
| rbsp_trailing_bits( ) | |
| } | |

For each coded picture referring, to the PPS, pic_type_idc is used to determine whether to parse syntax elements related to intra slices (I slices) and inter slices (B, P slices). For instance, intra slice related syntax elements pic_log 2_diff_min_qt_min_cb_intra_slice_luma, pic_max_mtt_hierarchy_depth_intra_slice_luma, pic_log 2_diff_max_bt_min_qt_intra_slice_luma, pic_log 2_diff_max_tt_min_qt_intra_slice_luma, pic_log 2_diff_min_qt_min_cb_intra_slice_chroma, pic_max_mtt_hierarchy_depth_intra_slice_chroma, pic_log 2_diff_max_bt_min_qt_intra_slice_chroma and pic_log 2_diff_max_tt_min_qt_intra_slice_chroma are decoded only whenever there are only I slices associated to the PH. On the other hand, inter slice related syntax elements are decoded whenever there exists inter slices.

In one example, pic_type_idc is signaled in PH such that it specifies the slice types for all slices of a coded picture associated to the PH. Detailed syntax and semantic are given as follow. Changes compared to VVC Draft 7 are italicized.

TABLE 13

| Proposed Picture Header RBSP Syntax | |
|---|---|
| Syntax Element | Descriptor |

```
picture_header_rbsp( ) {
    non_reference_picture_flag                                          u(1)
    gdr_pic_flag                                                        u(1)
    no_output_of_prior_pics_flag                                        u(1)
    if( gdr_pic_flag )
        recovery_poc_cnt                                                ue(v)
    ph_pic_parameter_set_id                                             ue(v)
    pic_type_idc                                                        ue(v)
    if( sps_poc_msb_flag ) {
        ph_poc_msb_present_flag                                         u(1)
        if( ph_poc_msb_present_flag )
            poc_msb_val                                                 u(v)
    }
    if( sps_subpic_id_present_flag
&& !sps_subpic_id_signalling_flag ) {
        ph_subpic_id_signalling_present_flag                            u(1)
        if( ph_subpics_id_signalling_present_flag ) {
            ph_subpic_id_len_minus1                                     ue(v)
            for( i = 0; i <= sps_num_subpics_minus1; i++ )
                ph_subpic_id[ i ]                                       u(v)
        }
    }
    if( !sps_loop_filter_across_virtual_boundaries_disabled_present_flag )
{
        ph_loop_filter_across_virtual_boundaries_disabled_present_flag  u(1)
        if( ph_loop_filter_across_virtual_boundaries_disabled_present_flag
            ph_num_ver_virtual_boundaries                               u(2)
            for( i = 0; i < ph_num_ver_virtual_boundaries; i++ )
                ph_virtual_boundaries_pos_x[ i ]                        u(13)
            ph_num_hor_virtual_boundaries                               u(2)
            for( i = 0; i < ph_num_hor_virtual_boundaries; i++ )
                ph_virtual_boundaries_pos_y[ i ]                        u(13)
        }
    }
    if( separate_colour_plane_flag = = 1 )
        colour_plane_id                                                 u(2)
    if( output_flag_present_flag )
        pic_output_flag                                                 u(1)
    pic_rpl_present_flag                                                u(1)
    if( pic_rpl_present_flag ) {
        for( i = 0; i < 2; i++ ) {
            if( num_ref_pic_lists_in_sps[ i ] > 0
&& !pps_ref_pic_list_sps_idc[ i ] &&
                    ( i = = 0 | | ( i = = 1 &&
rpl1_idx_present_flag ) ) )
                pic_rpl_sps_flag[ i ]                                   u(1)
            if( pic_rpl_sps_flag[ i ] ) {
                if( num_ref_pic_lists_in_sps[ i ] > 1 &&
                    ( i = = 0 | | ( i = = 1
&& rpl1_idx_present_flag ) ) )
                    pic_rpl_idx[ i ]                                    u(v)
            } else
                ref_pic_list_struct(i,
num_ref_pic_lists_in_sps[ i ] )
            for( j = 0; j < NumLtrpEntries[ i ][ RplsIdx[ i ] ]; j++ ) {
                if( ltrp_in_slice_header_flag[ i ][ RplsIdx[ i ] ] )
                    pic_poc_lsb_lt[ i ][ j ]                            u(v)
                pic_delta_poc_msb_present_flag[ i ][ j ]                u(1)
                if( pic_delta_poc_msb_present_flag[ i ][ j ] )
                    pic_delta_poc_msb_cycle_lt[ i ][ j ]                ue(v)
            }
        }
    }
    if( partition_constraints_override_enabled_flag ) {
        partition_constraints_override_flag                             u(1)
        if( partition_constraints_override_flag ) {
            if (pic_type_idc != 2 ) {
                pic_log2_diff_min_qt_min_cb_intra_slice_luma            ue(v)
                pic_log2_diff_min_qt_min_cb_inter_slice                 ue(v)
                pic_max_mtt_hierarchy_depth_inter_slice                 ue(v)
                pic_max_mtt_hierarchy_depth_intra_slice_luma            ue(v)
                if( pic_max_mtt_hierarchy_depth_intra_slice_luma != 0 ) {
                    pic_log2_diff_max_bt_min_qt_intra_slice_luma        ue(v)
                    pic_log2_diff_max_tt_min_qt_intra_slice_luma        ue(v)
                if( pic_max_mtt_hierarchy_depth_inter_slice_!= 0 )
```

TABLE 13-continued

Proposed Picture Header RBSP Syntax

| Syntax Element | Descriptor |
|---|---|
| {      pic_log2_diff_max_bt_min_qt_inter_slice | ue(v) |
|      pic_log2_diff_max_tt_min_qt_inter_slice | ue(v) |
|    } | |
|    if( qtbtt_dual_tree_intra_flag ) { | |
| pic_log2_diff_min_qt_min_cb_intra_slice_chroma | ue(v) |
| pic_max_mtt_hierarchy_depth_intra_slice_chroma | ue(v) |
| if( pic_max_mtt_hierarchy_depth_intra_slice_chroma != 0 ) { | |
| pic_log2_diff_max_bt_min_qt_intra_slice_chroma | ue(v) |
| pic_log2_diff_max_tt_min_qt_intra_slice_chroma | ue(v) |
|      } | |
|    } | |
| } | |
| *if (pic_type_idc != 1) {* | |
|    pic_log2_diff_min_qt_min_cb_inter_slice | |
|    pic_max_mtt_hierarchy_depth_inter_slice | |
| if( pic_max_mtt_hierarchy_depth_inter_slice_!= 0 ) { | |
| pic_log2_diff_max_bt_min_qt_inter_slice | ue(v) |
| pic_log2_diff_max_tt_min_qt_inter_slice | ue(v) |
|      } | |
|    } | |
| } | |
| if( cu_qp_delta_enabled_flag ) { | |
|    if (pic_type_idc != 2) | |
|      pic_cu_qp_delta_subdiv_intra_slice | ue(v) |
|    *if (pic_type_idc != 1)* | |
|      pic_cu_qp_delta_subdiv_inter_slice | ue(v) |
| } | |
| if( pps_cu_chroma_qp_offset_list_enabled_flag ) { | |
|    *if (pic_type_idc != 2)* | |
|      pic_cu_chroma_qp_offset_subdiv_intra_slice | ue(v) |
|    *if (pic_type idc != 1)* | |
|      pic_cu_chroma_qp_offset_subdiv_inter_slice | ue(v) |
| } | |
| *if (pic_type_idc != 1) {* | |
|    if( sps_temporal_mvp_enabled_flag ) | |
|      pic_temporal_mvp_enabled_flag | u(1) |
|    if(!pps_mvd_l1_zero_idc ) | |
|      mvd_l1_zero_flag | u(1) |
|    if( !pps_six_minus_max_num_merge_cand_plus1 ) | |
|      pic_six_minus_max_num_merge_cand | ue(v) |
|    if( sps_affine_enabled_flag ) | |
|      pic_five_minus_max_num_subblock_merge_cand | ue(v) |
|    if( sps_fpel_mmvd_enabled_flag ) | |
|      pic_fpel_mmvd_enabled_flag | u(1) |
|    if( sps_bdof_pic_present_flag ) | |
|      pic_disable_bdof_flag | u(1) |
|    if( sps_dmvr_pic_present_flag ) | |
|      pic_disable_dmvr_flag | u(1) |
|    if( sps_prof_pic_present_flag ) | |
|      pic_disable_prof_flag | u(1) |
|    if( sps_triangle_enabled_flag && MaxNumMergeCand >= 2 && !pps_max_num_merge_cand_minus_max_num_triangle_cand_plus 1) | |
|      pic_max_num_merge_cand_minus_max_num_triangle_cand | ue(v) |
| } | |
| if ( sps_ibc_enabled_flag ) | |
|    pic_six_minus_max_num_ibc_merge_cand | ue(v) |
| if( sps_joint_cbcr_enabled_flag ) | |
|    pic_joint_cbcr_sign_flag | u(1) |
| if( sps sao_enabled_flag ) { | |
|    pic_sao_enabled_present_flag | u(1) |
|    if( pic_sao_enabled_present_flag ) { | |
|      pic_sao_luma_enabled_flag | u(1) |
|      if(ChromaArrayType != 0 ) | |
|        pic_sao_chroma_enabled_flag | u(1) |
|    } | |
| } | |
| if( sps_alf_enabled_flag ) { | |
|    pic_alf_enabled_present_flag | u(1) |
|    if( pic_alf_enabled_present_flag ) { | |
|      pic_alf_enabled_flag | u(1) |

TABLE 13-continued

Proposed Picture Header RBSP Syntax

| Syntax Element | Descriptor |
|---|---|
|     if( pic_alf_enabled_flag ) { | |
|       pic_num_alf_aps_ids_luma | u(3) |
|       for( i = 0; i < pic_num_alf_aps_ids_luma; i++ ) | |
|         pic_alf_aps_id_luma[ i ] | u(3) |
|       if( ChromaArrayType != 0 ) | |
|         pic_alf_chroma_idc | u(2) |
|       if( pic_alf_chroma_idc ) | |
|         pic_alf_aps_id_chroma | u(3) |
|     } | |
|   } | |
| } | |
| if ( ! pps_dep_quant_enabled_idc) | |
|   pic_dep_quant_enabled_flag | u(1) |
| if( !pic_dep_quant_enabled_flag ) | |
|   sign_data_hiding_enabled_flag | u(1) |
| if( deblocking_filter_override_enabled_flag ) { | |
|   pic_deblocking_filter_override_present_flag | u(1) |
|   if( pic_deblocking_filter_override_present_flag ) { | |
|     pic_deblocking_filter_override_flag | u(1) |
|     if( pic_deblocking_filter_override_flag ) { | |
|       pic_deblocking_filter_disabled_flag | u(1) |
|       if( !pic_deblocking_filter_disabled_flag ) { | |
|         pic_beta_offset_div2 | se(v) |
|         pic_tc_offset_div2 | se(v) |
|       } | |
|     } | |
|   } | |
| } | |
| if( sps_lmcs_enabled_flag ) { | |
|   pic_lmcs_enabled_flag | u(1) |
|   if( pic_lmcs_enabled_flag ) { | |
|     pic_lmcs_aps_id | u(2) |
|     if( ChromaArrayType != 0) | |
|       pic_chroma_residual_scale_flag | u(1) |
|   } | |
| } | |
| if( sps_scaling_list_enabled_flag ) { | |
|   pic_scaling_list_present_flag | u(1) |
|   if( pic_scaling_list_present_flag ) | |
|     pic_scaling_list_aps_id | u(3) |
| } | |
| if( picture_header_extension_present_flag ) { | |
|   ph_extension_length | ue(v) |
|   for( i = 0; i < ph_extension_length; i++) | |
|     ph_extension_data_byte[ i ] | u(8) |
| } | |
| rbsp_trailing_bits( ) | |
| } | |

For each coded picture, pic_type_idc is used to determine whether to parse syntax elements related to intra slices (I slice) and inter slices (B, P slice). For instance, intra slice related syntax elements pic_log 2_diff_min_qt_min_cb_intra_slice_luma, pic_max_mtt_hierarchy_depth_intra_slice_luma, pic_log 2_diff_max_bt_min_qt_intra_slice_luma, pic_log 2_diff_max_tt_min_qt_intra_slice_luma, pic_log 2_diff_min_qt_min_cb_intra_slice_chroma, pic_max_mtt_hierarchy_depth_intra_slice_chroma, pic_log 2_diff_max_bt_min_qt_intra_slice_chroma and pic_log 2_diff_max_tt_min_qt_intra_slice_chroma are decoded only whenever there are only I slices associated to the PH. On the other hand, inter slice related syntax elements are decoded whenever there exists inter slices.

In one embodiment, pic_type_idc may be present in both PPS and PH referring to the PPS as pps_pic_type_idc and ph_pic_type_idc respectively.

TABLE 14

Proposed Picture Parameter Set RBSP Syntax

| Syntax Element | Descriptor |
|---|---|
| pic_parameter_set_rbsp( ) { | |
|   pps_pic_parameter_set_id | ue(v) |
|   pps_seq_parameter_set_id | u(4) |
|   pic_width_in_luma_samples | ue(v) |
|   pic_height_in_luma_samples | ue(v) |
|   *pps_pic_type_idc* | ue(v) |

TABLE 14-continued

Proposed Picture Parameter Set RBSP Syntax

| Syntax Element | Descriptor |
|---|---|
| conformance_window_flag | u(1) |
| if( conformance_window_flag ) { | |
|    conf_win_left_offset | ue(v) |
|    conf_win_right_offset | ue(v) |
|    conf_win_top_offset | ue(v) |
|    conf_win_bottom_offset | ue(v) |
| } | |
| scaling_window_flag | u(1) |
| if( scaling_window_flag ) { | |
|    scaling_win_left_offset | ue(v) |
|    scaling_win_right_offset | ue(v) |
|    scaling_win_top_offset | ue(v) |
|    scaling_win_bottom_offset | ue(v) |
| } | |
| output_flag_present_flag | u(1) |
| mixed_nalu_types_in_pic_flag | u(1) |
| pps_subpic_id_signalling_present_flag | u(1) |
| if( pps_subpics_id_signalling_present_flag ) { | |
|    pps_num_subpics_minus1 | ue(v) |
|    pps_subpic_id_len_minus1 | ue(v) |
|    for( i = 0; i <= pps_num_subpic_minus1; i++ ) | |
|      pps_subpic_id[ i ] | u(v) |
| } | |
| no_pic_partition_flag | u(1) |
| if( !no_pic_partition_flag ) { | |
|    pps_log2_ctu_size_minus5 | u(2) |
|    num_exp_tile_columns_minus1 | ue(v) |
|    num_exp_tile_rows_minus1 | ue(v) |
|    for( i= 0; i <= num_exp_tile_columns_minus1; i++ ) | |
|      tile_column_width_minus1[ i ] | ue(v) |
|    for( i = 0; i <= num_exp_tile_rows_minus1; i++ ) | |
|      tile_row_height_minus1[ i ] | ue(v) |
|    rect_slice_flag | u(1) |
|    if( rect_slice_flag ) | |
|      single_slice_per_subpic_flag | u(1) |
|    if( rect_slice_flag && !single_slice_per_subpic_flag ) { | |
|      num_slices_in_pic_minus1 | ue(v) |
|      tile_idx_delta_present_flag | u(1) |
|      for( i = 0; i < num_slices_in_pic_minus1; i++ ) { | |
|         slice_width_in_tiles_minus1[ i ] | ue(v) |
|         slice_height_in_tiles_minus1[ i ] | ue(v) |
|         if( slice_width_in_tiles_minus1[ i ] == 0 && | |
| slice_height_in_tiles_minus1[ i ] == 0 ) { | |
|            num_slices_in_tile_minus1[ i ] | ue(v) |
|            num_SlicesInTileMinus1 = num_slices_in_tile_minus1[ i ] | |
|            for (j = 0; j < num_SlicesInTileMinus1; j++ ) | |
|               slice_height_in_ctu_minus1[ i++ ] | ue(v) |
|         } | |
|         if( tile_idx_delta_present_flag && i < num_slices_in_pic_minus1 ) | |
|            tile_idx_delta[ i ] | se(v) |
|      } | |
|    } | |
|    loop_filter_across_tiles_enabled_flag | u(1) |
|    loop_filter_across_slices_enabled_flag | u(1) |
| } | |
| entropy_coding_sync_enabled_flag | u(1) |
| if( !no_pic_partition_flag_entropy_coding_sync_enabled_flag ) | |
|    entry_point_offsets_present_flag | u(1) |
| cabac_init_present_flag | u(1) |
| for( i = 0; i < 2; i++ ) | |
|    num_ref_idx_default_active_minus1[ i ] | ue(v) |
| rpl1_idx_present_flag | u(1) |
| init_qp_minus26 | se(v) |
| log2_transform_skip_max_size_minus2 | ue(v) |
| cu_qp_delta_enabled_flag | u(1) |
| pps_cb_qp_offset | se(v) |
| pps_cr_qp_offset | se(v) |
| pps_joint_cbcr_qp_offset_present_flag | u(1) |
| if( pps_joint_cbcr_qp_offset_present_flag ) | |
|    pps_joint_cbcr_qp_offset_value | se(v) |
| pps_slice_chroma_qp_offsets_present_flag | u(1) |
| pps_cu_chroma_qp_offset_list_enabled_flag | u(1) |

TABLE 14-continued

Proposed Picture Parameter Set RBSP Syntax

| Syntax Element | Descriptor |
|---|---|
| if( pps_cu_chroma_qp_offset_list_enabled_flag ) { | |
|    chroma_qp_offset_list_len_minus1 | ue(v) |
|    for( i = 0; i <= chroma_qp_offset_list_len minus1; i++ ) { | |
|      cb_qp_offset_list[ i ] | se(v) |
|      cr_qp_offset_list[ i ] | se(v) |
|      if( pps_joint_cbcr_qp_offset_present_flag ) | |
|        joint_cbcr_qp_offset_list[ i ] | se(v) |
|    } | |
| } | |
| pps_weighted_pred_flag | u(1) |
| pps_weighted_bipred_flag | u(1) |
| deblocking_filter_control_present_flag | u(1) |
| if( deblocking_filter_control_present_flag ) { | |
|    deblocking_filter_override_enabled_flag | u(1) |
|    pps_deblocking_filter_disabled_flag | u(1) |
|    if( !pps_deblocking_filter_disabled_flag ) { | |
|      pps_beta_offset_div2 | se(v) |
|      pps_tc_offset_div2 | se(v) |
|    } | |
| } | |
| constant_slice_header_params_enabled_flag | u(1) |
| if( constant_slice_header_params_enabled_flag ) { | |
|    pps_dep_quant_enabled_idc | u(2) |
|    for( i = 0; i < 2; i++ ) | |
|      pps_ref_pic_list_sps_idc[ i ] | u(2) |
|    *if (pps_pic_type_idc != 1) {* | |
|      pps_mvd_l1_zero_idc | u(2) |
|      pps_collocated_from_l0_idc | u(2) |
|      pps_six_minus_max_num_merge_cand_plus1 | ue(v) |
|    pps_max_num_merge_cand_minus_max_num_triangle_cand_plus1 | ue(v) |
|    } | |
| } | |
|    picture_header_extension_present_flag | u(1) |
| slice_header_extension_present_flag | u(1) |
|    pps_extension_flag | u(1) |
|    if( pps_extension_flag ) | |
|      while( more_rbsp_data( ) ) | |
|        pps_extension_data_flag | u(1) |
|    rbsp_trailing_bits( ) | |
| } | |

Here, pps_pic_type_idc specifies the slice types for all slices of each coded picture referring to the PPS.

Also, pps_mvd_l1_zero_idc equal to 0 specifies that the syntax element mvd_l1_zero_flag is present in PHs referring to the PPS. Further, pps_mvd_l1_zero_idc equal to 1 or 2 specifies that mvd_l1_zero_flag is not present in PHs referring to the PPS. Additionally, pps_mvd_l1_zero_idc equal to 3 is reserved for future use by ITU-T|ISO/IEC. When not present, pps_mvd_l1_zero_idc may be inferred to be equal to 0.

Also, pps_collocated_from_l0_idc equal to 0 specifies that the syntax element collocated_from_l0_flag is present in slice headers of slices referring to the PPS. Further, pps_collocated_from_l0_idc equal to 1 or 2 specifies that the syntax element collocated_from_l0_flag is not present in slice headers of slices referring to the PPS. Further, pps_collocated_from_l0_idc equal to 3 is reserved for future use by ITU-T|ISO/IEC. When not present, pps_collocated_from_l0_idc may be inferred to be equal to 0.

Also, pps_six_minus_max_num_merge_cand_plus1 equal to 0 specifies that pic_six_minus_max_num_merge_cand is present in PHs referring to the PPS. Further, pps_six_minus_max_num_merge_cand_plus1 greater than 0 specifies that pic_six_minus_max_num_merge_cand is not present in PHs referring to the PPS. The value of pps_six_minus_max_num_merge_cand_plus1 shall be in the range of 0 to 6, inclusive. When not present, pps_six_minus_max_num_merge_cand_plus1 may be inferred to be equal to 0.

Also, pps_max_num_merge_cand_minus_max_num_triangle_cand_plus1 equal to 0 specifies that pic_max_num_merge_cand_minus_max_num_triangle_cand is present in PHs of slices referring to the PPS. Further, pps_max_num_merge_cand_minus_max_num_triangle_cand_plus1 greater than 0 specifies that pic_max_num_merge_cand_minus_max_num_triangle_cand is not present in PHs referring to the PPS. The value of pps_max_num_merge_cand_minus_max_num_triangle_cand_plus1 shall be in the range of 0 to MaxNumMergeCand−1. When not present, pps_max_num_merge_cand_minus_max_num_triangle_cand_plus1 can be inferred to be equal to 0.

In one example, when the value of pps_pic_type_idc indicates presence of one type of slice (I or B or P slice as in Table 10 value 1, 2 and 3), the value of ph_pic_type_idc may be inferred from the value of pps_pic_type_idc.

TABLE 15

Proposed Picture Header RBSP Syntax

| Syntax Element | Descriptor |
|---|---|
| picture_header_rbsp( ) { | |
|   non_reference_picture_flag | u(1) |
|   gdr_pic_flag | u(1) |
|   no_output_of_prior_pics_flag | u(1) |
|   if( gdr_pic_flag ) | |
|     recovery_poc_cnt | ue(v) |
|   ph_pic_parameter_set id | ue(v) |
|   *ph_pic_type_idc* | ue(v) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|   if( sps_subpic_id_present_flag && !sps_subpic_id_signalling_flag ) { | |
|     ph_subpic_id_signalling_present_flag | u(1) |
|     if( ph_subpics_id_signalling_present_flag ) { | |
|       ph_subpic_id_len_minus1 | ue(v) |
|       for( i = 0; i <= sps_num_subpics_minus1; i++ ) | |
|         ph_subpic_id[ i ] | u(v) |
|     } | |
|   } | |
|   if( !sps_loop_filter_across_virtual_boundaries_disabled_present_flag ) { | |
|     ph_loop_filter_across_virtual_boundaries_disabled_present_flag | u(1) |
|     if( ph_loop_filter_across_virtual_boundaries_disabled_present_flag ) | |
| { | |
|       ph_num_ver_virtual_boundaries | u(2) |
|       for( i = 0; i < ph_num_ver_virtual_boundaries; i++ ) | |
|         ph_virtual_boundaries_pos_x[ i ] | u(13) |
|       ph_num_hor_virtual_boundaries | u(2) |
|       for( i = 0; i < ph_num_hor_virtual_boundaries; i++ ) | |
|         ph_virtual_boundaries_pos_y[ i ] | u(13) |
|     } | |
|   } | |
|   if( separate_colour_plane_flag = = 1 ) | |
|     colour_plane_id | u(2) |
|   if( output_flag_present_flag ) | |
|     pic_output_flag | u(1) |
|   pic_rpl_present_flag | u(1) |
|   if( pic_rpl_present_flag ) { | |
|     for (i = 0; i < 2; i++ ) { | |
|       if( num_ref_pic_lists_in_sps[ i ] > 0 && !pps_ref_pic_list_sps_idc[ i ] && | |
|         (i = 0 | | (i = = 1 && rpl1_idx_present_flag ) ) ) | |
|         pic_rpl_sps_flag[ i ] | u(1) |
|       if( pic_rpl_sps_flag[ i ] ) { | |
|         if( num_ref_pic_lists_in_sps[ i ] > 1 && | |
|           (i = = 0 | | (i = = 1 && rpl1_idx_present_flag ) ) ) | |
|         pic_rpl_idx[ i ] | u(v) |
|       } else | |
|         ref_pic_list_struct( i, num_ref_pic_lists_in_sps[ i ] ) | |
|       for( j = 0; j < NumLtrpEntries[ i ][ RplsIdx[ i ] ]; j++ ) { | |
|         if( ltrp_in_slice_header_flag[ i ][ RplsIdx[ i ] ] ) | |
|           pic_poc_lsb_lt[ i ][ j ] | u(v) |
|         pic_delta_poc_msb_present_flag[ i ][ j ] | u(1) |
|         if( pic_delta_poc_msb_present_flag[ i ][ j ] ) | |
|           pic_delta_poc_msb_cycle_lt[ i ][ j ] | ue(v) |
|       } | |
|     } | |
|   } | |
|   if( partition_constraints_override_enabled_flag ) { | |
|     partition_constraints_override_flag | u(1) |
|     if( partition_constraints_override_flag ) { | |
|       *if (ph pic_type_idc != 2) {* | |
|         pic_log2_diff_min_qt_min_cb_intra_slice_luma | ue(v) |
|         *pic_log2_diff_min_qt_min_cb_inter_slice* | ue(v) |
|         *pic_max_mtt_hierarchy_depth_inter_slice* | ue(v) |
|         pic_max_mtt_hierarchy_depth_intra_slice_luma | ue(v) |
|         if( pic_max_mtt_hierarchy_depth_intra_slice_luma != 0 ) { | |
|           pic_log2_diff_max_bt_min_qt_intra_slice_luma | ue(v) |
|           pic_log2_diff_max_tt_min_qt_intra_slice_luma | ue(v) |
|         } | |
|       *if( pic_max_mtt_hierarchy depth_inter_slice_!= 0) {* | |
|         *pic_log2_diff_max_bt_min_qt_inter_slice* | ue(v) |
|         *pic_log2_diff_max_tt_min_qt_inter_slice* | ue(v) |
|       } | |
|       if( qtbtt_dual_tree_intra_flag ) { | |

TABLE 15-continued

Proposed Picture Header RBSP Syntax

| Syntax Element | Descriptor |
|---|---|
|         pic_log2_diff_min_qt_min_cb_intra_slice_chroma | ue(v) |
|         pic_max_mtt_hierarchy_depth_intra_slice_chroma | ue(v) |
|         if( pic_max_mtt_hierarchy_depth_intra_slice_chroma != 0 ) { | |
|            pic_log2_diff_max_bt_min_qt_intra_slice_chroma | ue(v) |
|            pic_log2_diff_max_tt_min_qt_intra_slice_chroma | ue(v) |
|         } | |
|       } | |
|     } | |
|     *if (ph_pic_type_idc != 1) {* | |
|         pic_log2_diff_min_qt_min_cb_inter_slice | |
|         pic_max_mtt_hierarchy_depth_inter_slice | |
|         if( pic_max_mtt_hierarchy_depth_inter_slice_!= 0 ) { | |
|            pic_log2_diff_max_bt_min_qt_inter_slice | ue(v) |
|            pic_log2_diff_max_tt_min_qt_inter_slice | ue(v) |
|         } | |
|     } | |
|   } | |
| } | |
| if( cu_qp_delta_enabled_flag ) { | |
|   *if (ph pic_type_idc != 2)* | |
|     pic_cu_qp_delta_subdiv_intra_slice | ue(v) |
|   *if (ph pic_type_idc != 1)* | |
|     pic_cu_qp_delta_subdiv_inter_slice | ue(v) |
| } | |
| if( pps_cu_chroma_qp_offset_list_enabled_flag ) { | |
|   *if (ph pic_type_idc != 2)* | |
|     pic_cu_chroma_qp_offset_subdiv_intra_slice | ue(v) |
|   *if (ph pic_type_idc != 1)* | |
|     pic_cu_chroma_qp_offset_subdiv_inter_slice | ue(v) |
| } | |
| *if (ph pic_type_idc != 1) {* | |
|   if( sps_temporal_mvp_enabled_flag ) | |
|     pic_temporal_mvp_enabled_flag | u(1) |
|   if( !pps_mvd_l1_zero_idc ) | |
|     mvd_l1_zero_flag | u(1) |
|   if( !pps_six_minus_max_num_merge_cand_plus1 ) | |
|     pic_six_minus_max_num_merge_cand | ue(v) |
|   if( sps_affine_enabled_flag ) | |
|     pic_five_minus_max_num_subblock_merge_cand | ue(v) |
|   if( sps_fpel_mmvd_enabled_flag ) | |
|     pic_fpel_mmvd_enabled_flag | u(1) |
|   if( sps_bdof_pic_present_flag ) | |
|     pic_disable_bdof_flag | u(1) |
|   if( sps_dmvr_pic_present_flag ) | |
|     pic_disable_dmvr_flag | u(1) |
|   if( sps_prof_pic_present_flag ) | |
|     pic_disable_prof_flag | u(1) |
|   if( sps_triangle_enabled_flag && MaxNumMergeCand >= 2 && | |
| !pps_max_num_merge_cand_minus_max_num_triangle_cand_plus1 ) | |
|     pic_max_num_merge_cand_minus_max_num_triangle_cand | ue(v) |
| } | |
| if ( sps_ibc_enabled_flag ) | |
|   pic_six_minus_max_num_ibc_merge_cand | ue(v) |
| if( sps_joint_cbcr_enabled_flag ) | |
|   pic_joint_cbcr_sign_flag | u(1) |
| if( sps_sao_enabled_flag ) { | |
|   pic_sao_enabled_present_flag | u(1) |
|   if( pic_sao_enabled_present_flag ) { | |
|     pic_sao_luma_enabled_flag | u(1) |
|     if( ChromaArrayType != 0 ) | |
|       pic_sao_chroma_enabled_flag | u(1) |
|   } | |
| } | |
| if( sps_alf_enabled_flag ) { | |
|   pic_alf_enabled_present_flag | u(1) |
|   if( pic_alf_enabled_present_flag ) { | |
|     pic_alf_enabled_flag | u(1) |
|     if( pic_alf_enabled_flag ) { | |
|       pic_num_alf_aps_ids_luma | u(3) |
|       for( i = 0; i < pic_num_alf_aps_ids_luma; i++ ) | |
|         pic_alf_aps_id_luma[ i ] | u(3) |
|       if( ChromaArrayType != 0 ) | |
|         pic_alf_chroma_idc | u(2) |
|       if( pic_alf_chroma_idc ) | |
|         pic_alf_aps_id_chroma | u(3) |
|     } | |

TABLE 15-continued

Proposed Picture Header RBSP Syntax

| Syntax Element | Descriptor |
|---|---|
|     } | |
|   } | |
|   if ( ! pps_dep_quant_enabled_idc) | |
|     pic_dep_quant_enabled_flag | u(1) |
|   if( !pic_dep_quant_enabled_flag ) | |
|     sign_data_hiding_enabled_flag | u(1) |
|   if( deblocking_filter_override_enabled_flag ) { | |
|     pic_deblocking_filter_override_present_flag | u(1) |
|     if( pic_deblocking_filter_override_present_flag ) { | |
|       pic_deblocking_filter_override_flag | u(1) |
|       if( pic_deblocking_filter_override_flag ) { | |
|         pic_deblocking_filter_disabled_flag | u(1) |
|         if( !pic_deblocking_filter_disabled_flag ) { | |
|           pic_beta_offset_div2 | se(v) |
|           pic_tc_offset_div2 | se(v) |
|         } | |
|       } | |
|     } | |
|   } | |
|   if( sps_lmcs_enabled_flag ) { | |
|     pic_lmcs_enabled_flag | u(1) |
|     if( pic_lmcs_enabled_flag ) { | |
|       pic_lmcs_aps_id | u(2) |
|       if( ChromaArrayType != 0 ) | |
|         pic_chroma_residual_scale_flag | u(1) |
|     } | |
|   } | |
|   if( sps_scaling_list_enabled_flag ) { | |
|     pic_scaling_list_present_flag | u(1) |
|     if( pic_scaling_list_present_flag ) | |
|       pic_scaling_list_aps_id | u(3) |
|   } | |
|   if( picture_header_extension_present_flag ) { | |
|     ph_extension_length | ue(v) |
|     for( i = 0; i < ph_extension_length; i++) | |
|       ph_extension_data_byte[ i ] | u(8) |
|   } | |
|   rbsp_trailing_bits( ) | |
| } | |

Here, ph_pic_type_idc specifies the slice types for all slices of each coded picture associated to the PH.

In one embodiment, ph_pic_type_idc equal to 1 indicates each coded picture associated to the PH has only one or more I slices.

TABLE 16

Examples of Possible pic_type_idc Semantics

| ph_pic_type_idc | slice_type that present_in_a coded picture |
|---|---|
| 0 | B, P, I |
| 1 | I |
| 2 | B, P |

If pps_pic_type_idc equal to 0 (B, P, I slices as in Table 10), the value of ph_pic_type_idc has a range from 0 to 2, inclusive. Otherwise, the value of ph_pic_type_idc can be inferred from pps_pic_type_idc (e.g., an identical one). In such a case, it is a requirement of bitstream conformance that the values of ph_pic_type_idc be equal to those of pps_pic_type_idc.

In one example, the signaling of syntax ph_pic_type_idc depends on (e.g., is constrained by) the value of pps_pic_type_idc. When the value of pps_pic_type_idc indicates the presence of both intra slices (I slice) and inter slices (B, P slice) in coded pictures, ph_pic_type_idc may need to be signaled/parsed to indicate slice types present in that picture associated with the picture header. In other cases, when pps_pic_type_idc indicates the presence of only one slice type, ph_pic_type_idc is not signaled/parsed, and it is inferred to be equal to (e.g., have the same) the slice type of pps_pic_type_idc. It is a bitstream conforming requirement that the range of ph_pic_type_idc is no larger than the range of pps_pic_type_idc.

TABLE 17

Proposed Picture Header RBSP Syntax

| Syntax Element | Descriptor |
|---|---|
| picture_header_rbsp( ) { | |
|   non_reference_picture_flag | u(1) |
|   gdr_pic_flag | u(1) |
|   no_output_of_prior_pics_flag | u(1) |
|   if( gdr_pic_flag ) | |

TABLE 17-continued

Proposed Picture Header RBSP Syntax

| Syntax Element | Descriptor |
|---|---|
|     recovery_poc_cnt | ue(v) |
|     ph_pic_parameter_set id | ue(v) |
|     *if (pps_pic_type_idc == 0)* | |
|       ph_pic_type_idc | ue(v) |
|     if( sps_poc_msb_flag ) { | |
|       ph_poc_msb_present_flag | u(1) |
|       if( ph_poc_msb_present_flag ) | |
|         poc_msb_val | u(v) |
|     } | |
|     if( sps_subpic_id_present_flag && !sps_subpic_id_signalling_flag ) { | |
|       ph_subpic_id_signalling_present_flag | u(1) |
|       if( ph_subpics_id_signalling_present_flag ) { | |
|         ph_subpic_id_len_minus1 | ue(v) |
|         for( i = 0; i <= sps_num_subpics_minus1; i++ ) | |
|           ph_subpic_id[ i ] | u(v) |
|       } | |
|     } | |
|     if( !sps_loop_filter_across_virtual_boundaries_disabled_present_flag ) { | |
|       ph_loop_filter_across_virtual_boundaries_disabled_present_flag | u(1) |
|       if( ph_loop_filter_across_virtual_boundaries_disabled_present_flag ) { | |
|         ph_num_ver_virtual_boundaries | u(2) |
|         for( i = 0; i < ph_num_ver_virtual_boundaries; i++ ) | |
|           ph_virtual_boundaries_pos_x[ i ] | u(13) |
|         ph_num_hor_virtual_boundaries | u(2) |
|         for( i = 0; i < ph_num_hor_virtual_boundaries; i++ ) | |
|           ph_virtual_boundaries_pos_y[ i ] | u(13) |
|       } | |
|     } | |
|     if( separate_colour_plane_flag == 1 ) | |
|       colour_plane_id | u(2) |
|     if( output_flag_present_flag ) | |
|       pic_output_flag | u(1) |
|     pic_rpl_present_flag | u(1) |
|     if( pic_rpl_present_flag ) { | |
|       for( i = 0; i < 2; i++ ) { | |
|         if( num_ref_pic_lists_in_sps[ i ] >0 && !pps_ref_pic_list_sps_idc[ i ] && | |
|           ( i == 0 \|\|( i == 1 && rpl1_idx_present_flag ) ) ) | |
|           pic_rpl_sps_flag[ i ] | u(1) |
|         if( pic_rpl_sps_flag[ i ] ) { | |
|           if( num_ref_pic_lists_in_sps[ i ] > 1 && | |
|             ( i == 0 \|\| (i == 1 && rpl1_idx_present_flag ) ) ) | |
|           pic_rpl_idx[ i ] | u(v) |
|         } else | |
|           ref_pic_list_struct( i, num_ref_pic_lists_in_sps[ i ] ) | |
|         for( j = 0; j < NumLtrpEntries[ i ][ RplsIdx[ i ] ]; j++ ) { | |
|           if( ltrp_in_slice_header_flag[ i ][ RplsIdx[ i ] ] ) | |
|           pic_poc_lsb_lt[ i ][ j ] | u(v) |
|           pic_delta_poc_msb_present_flag[ i ][ j ] | u(1) |
|           if( pic_delta_poc_msb_present_flag[ i ][ j ] ) | |
|           pic_delta_poc_msb_cycle_lt[ i ][ j ] | ue(v) |
|         } | |
|       } | |
|     } | |
|     if( partition_constraints_override_enabled_flag ) { | |
|       partition_constraints_override_flag | u(1) |
|       if( partition_constraints_override_flag ) { | |
|         *if (ph_pic_type_idc != 2) {* | |
|           pic_log2_diff_min_qt_min_cb_intra_slice_luma | ue(v) |
|           *pic_log2_diff_min_qt_min_cb_inter_slice* | ue(v) |
|           *pic_max_mtt_hierarchy_depth_inter_slice* | ue(v) |
|           pic_max_mtt_hierarchy_depth_intra_slice_luma | ue(v) |
|           if( pic_max_mtt_hierarchy_depth_intra_slice_luma != 0 ) { | |
|             pic_log2_diff_max_bt_min_qt_intra_slice_luma | ue(v) |
|             pic_log2_diff_max_tt_min_qt_intra_slice_luma | ue(v) |
|           } | |
|         *if( pic_max_mtt_hierarchy depth_inter_slice_!= 0 ) {* | |
|           *pic_log2_diff_max_bt_min_qt_inter_slice* | ue(v) |
|           *pic_log2_diff_max_tt_min_qt_inter_slice* | ue(v) |
|         } | |
|         if( qtbtt_dual_tree_intra_flag ) { | |
|           pic_log2_diff_min_qt_min_cb_intra_slice_chroma | ue(v) |
|           pic_max_mtt_hierarchy_depth_intra_slice_chroma | ue(v) |
|           if( pic_max_mtt_hierarchy_depth_intra_slice_chroma != 0 ) { | |
|             pic_log2_diff_max_bt_min_qt_intra_slice_chroma | ue(v) |

TABLE 17-continued

Proposed Picture Header RBSP Syntax

| Syntax Element | Descriptor |
|---|---|
|         pic_log2_diff_max_tt_min_qt_intra_slice_chroma | ue(v) |
|       } | |
|     } | |
|   } | |
|   if (ph_pic_type_idc != 1) { | |
|     pic_log2_diff_min_qt_min_cb_inter_slice | |
|     pic_max_mtt_hierarchy_depth_inter_slice | |
|     if( pic_max_mtt_hierarchy_depth_inter_slice_ != 0 ) { | |
|       pic_log2_diff_max_bt_min_qt_inter_slice | ue(v) |
|       pic_log2_diff_max_tt_min_qt_inter_slice | ue(v) |
|     } | |
|   } | |
| } | |
| } | |
| if( cu_qp_delta_enabled_flag ) { | |
|   if (ph pic_type_idc != 2) | |
|     pic_cu_qp_delta_subdiv_intra_slice | ue(v) |
|   if (ph pic_type_idc != 1) | |
|     pic_cu_qp_delta_subdiv_inter_slice | ue(v) |
| if( pps_cu_chroma_qp_offset_list_enabled_flag ) { | |
| if (ph pic_type_idc != 2) | |
|   pic_cu_chroma_qp_offset_subdiv_intra_slice | ue(v) |
| if (ph pic_type_idc != 1) | |
|   pic_cu_chroma_qp_offset_subdiv_inter_slice | ue(v) |
| } | |
| if (ph pic_type_idc != 1) { | |
|   if( sps_temporal_mvp_enabled_flag ) | |
|     pic_temporal_mvp_enabled_flag | u(1) |
|   if(!pps_mvd_l1_zero_idc) | |
|     mvd_l1_zero_flag | u(1) |
|   if( !pps_six_minus_max_num_merge_cand_plus1 ) | |
|     pic_six_minus_max_num_merge_cand | ue(v) |
|   if( sps_affine_enabled_flag ) | |
|     pic_five_minus_max_num_subblock_merge_cand | ue(v) |
|   if( sps_fpel_mmvd_enabled_flag ) | |
|     pic_fpel_mmvd_enabled_flag | u(1) |
|   if( sps_bdof_pic_present_flag ) | |
|     pic_disable_bdof_flag | u(1) |
|   if( sps_dmvr_pic_present_flag ) | |
|     pic_disable_dmvr_flag | u(1) |
|   if( sps_prof_pic_present_flag ) | |
|     pic_disable_prof_flag | u(1) |
|   if( sps_triangle_enabled_flag && MaxNumMergeCand >= 2 && | |
|     !pps_max_num_merge_cand_minus_max_num_triangle_cand_plus1 ) | |
|     pic_max_num_merge_cand_minus_max_num_triangle_cand | ue(v) |
| } | |
| if ( sps_ibc_enabled_flag ) | |
|   pic_six_minus_max_num_ibc_merge_cand | ue(v) |
| if( sps_joint_cbcr_enabled_flag ) | |
|   pic_joint_cbcr_sign_flag | u(1) |
| if( sps_sao_enabled_flag ) { | |
|   pic_sao_enabled_present_flag | u(1) |
|   if( pic_sao_enabled_present_flag ) { | |
|     pic_sao_luma_enabled_flag | u(1) |
|     if( ChromaArrayType != 0 ) | |
|       pic_sao_chroma_enabled_flag | u(1) |
|   } | |
| } | |
| if( sps_alf_enabled_flag ) { | |
|   pic_alf_enabled_present_flag | u(1) |
|   if( pic_alf_enabled_present_flag ) { | |
|     pic_alf_enabled_flag | u(1) |
|     if( pic_alf_enabled_flag ) { | |
|       pic_num_alf_aps_ids_luma | u(3) |
|       for( i = 0; i < pic_num_alf_aps_ids_luma; i++ ) | |
|         pic_alf_aps_id_luma[ i ] | u(3) |
|       if( ChromaArrayType != 0 ) | |
|         pic_alf_chroma_idc | u(2) |
|       if( pic_alf_chroma_idc ) | |
|         pic_alf_aps_id_chroma | u(3) |
|     } | |
|   } | |
| } | |
| if ( ! pps_dep_quant_enabled_idc) | |
|   pic_dep_quant_enabled_flag | u(1) |
| if( !pic_dep_quant_enabled_flag ) | |

TABLE 17-continued

Proposed Picture Header RBSP Syntax

| Syntax Element | Descriptor |
|---|---|
|     sign_data_hiding_enabled_flag | u(1) |
|   if( deblocking_filter_override_enabled_flag ) { | |
|     pic_deblocking_filter_override_present_flag | u(1) |
|     if( pic_deblocking_filter_override_present_flag ) { | |
|       pic_deblocking_filter_override_flag | u(1) |
|       if( pic_deblocking_filter_override_flag ) { | |
|         pic_deblocking_filter_disabled_flag | u(1) |
|         if( !pic_deblocking_filter_disabled_flag ) { | |
|           pic_beta_offset_div2 | se(v) |
|           pic_tc_offset_div2 | se(v) |
|         } | |
|       } | |
|     } | |
|   } | |
|   if( sps_lmcs_enabled_flag ) { | |
|     pic_lmcs_enabled_flag | u(1) |
|     if( pic_lmcs_enabled_flag ) { | |
|       pic_lmcs_aps_id | u(2) |
|       if( ChromaArrayType != 0 ) | |
|         pic_chroma_residual_scale_flag | u(1) |
|     } | |
|   } | |
|   if( sps_scaling_list_enabled_flag ) { | |
|     pic_scaling_list_present_flag | u(1) |
|     if( pic_scaling_list_present_flag ) | |
|       pic_scaling_list_aps_id | u(3) |
|   } | |
|   if( picture_header_extension_present_flag ) { | |
|     ph_extension_length | ue(v) |
|     for( i = 0; i < ph_extension_length; i++) | |
|       ph_extension_data_byte[ i ] | u(8) |
|   } | |
|   rbsp_trailing_bits( ) | |
| } | |

Here, ph_pic_type_idc specifies the slice types for all slices of each coded picture associated to the PH. Also, ph_pic_type_idc may only be present in the bitstream when pps_pic_type_idc is equal to 0.

Further, ph_pic_type_idc equal to 1 indicates each coded picture associated to the PH has only one or more I slices. If pps_pic_type_idc equal to 0 (B, P, I slices as in Table 8), the value of ph_pic_type_idc has a range from 0 to 2, inclusive. Otherwise, when ph_pic_type_idc is not present, it is inferred to be equal to pps_ph_type_idc as in Table 8.

In one embodiment, PH related syntax elements are included in the slice layer RBSP NAL unit, and ph_present_flag is used to indicate the presence of PH related syntax in the slice layer RBSP NAL unit. Repetition of PH related syntax signaling may have an advantage of error resilience and error recovery. When the PH NAL unit is corrupted during transmission in any kind of network, slice layer RBSP NAL units are able to recover from the error with presence of PH in slice layer RBSP NAL units. Changes compared to VVC Draft 7 are italicizes.

TABLE 18

Proposed Slice Layer RBSP Syntax

| Syntax Element | Descriptor |
|---|---|
| slice_layer_rbsp() { | |
|   *ph_present_flag* | *u(1)* |
|   *if (ph_present_flag)* | |
|     *picture_header_rbsp( )* | |
|   slice_header( ) | |
|   slice_data( ) | |
|   rbsp_slice_trailing_bits( ) | |
| } | |

Here, ph_present_flag may be used to specify the presence of PH related syntax in the slice layer RBSP. When ph_present_flag equal to 1, PH related syntax is present. When ph_present_flag equal to 0, PH related syntax is not present in slice layer RBSP.

In one embodiment, when pic_type decoded in the AU delimiter as described above presents, pic_type_idc, signalling in HLS may be inferred from or constrained by the pic_type value.

In one example, when the pic_type is equal to 0 as in Table 5, indicating I slice, it is a requirement of bitstream conformance that the values of pic_type_idc specify that there are only intra slices in each picture. For instance, when pic_type_idc is conformed to be 1, there are intra slices only.

In one example, when pic_type_idc is constrained by the pic_type value, the range of pic_type_idc value may depend on the value of pic_type. For instance, pic_type_idc has values as described in Table 10, and if pic_type is equal to 1, the value of pic_type_idc may have 1 or 3. In other cases, when the pic_typie is equal to 2, the value of pic_type_idc ranges from 0 to 3.

In one embodiment, when pic_type_idc, signaled in HLS, as per the abovementioned method(s), slice_type may be inferred.

In one example, when pic_type_idc has value indicating that there are only intra slices, slice_type may be inferred to be 2.

In one example, when pic_type_idc has a value indicating that there are only inter slices, the value of slice_type has a range from 0 to 1, inclusive. For instance, when pic_type_idc has a value of 2 (B, P slice), then possible values for slice_type are 0 and 1.

In one embodiment, the value of slice_type may be inferred from the value pic_type_idc and num_slices_in_pic_minus1.

It is a requirement of bitstream conformance that the values of num_slices_in_pic_minus1 is greater than or equal to 1, when the value of pic_type_idc indicates that there are both intra slices and inter slices.

There may be cases when the value of pic_type_idc indicates there are both intra slices and inter slices exist in a coded picture, and the value of num_slices_in_pic_minus1 is greater than or equal to 1.

When all the previously coded slices are inter slices, then the last slice may be an intra slice with slice_type equal to 2 (I slice).

When all the previously coded slices are intra slices, then the last slice may be an inter slice with slice_type value ranging from 0 to 1, inclusive.

The above proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media. For example, FIG. 3 shows a computer system 300 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 3:
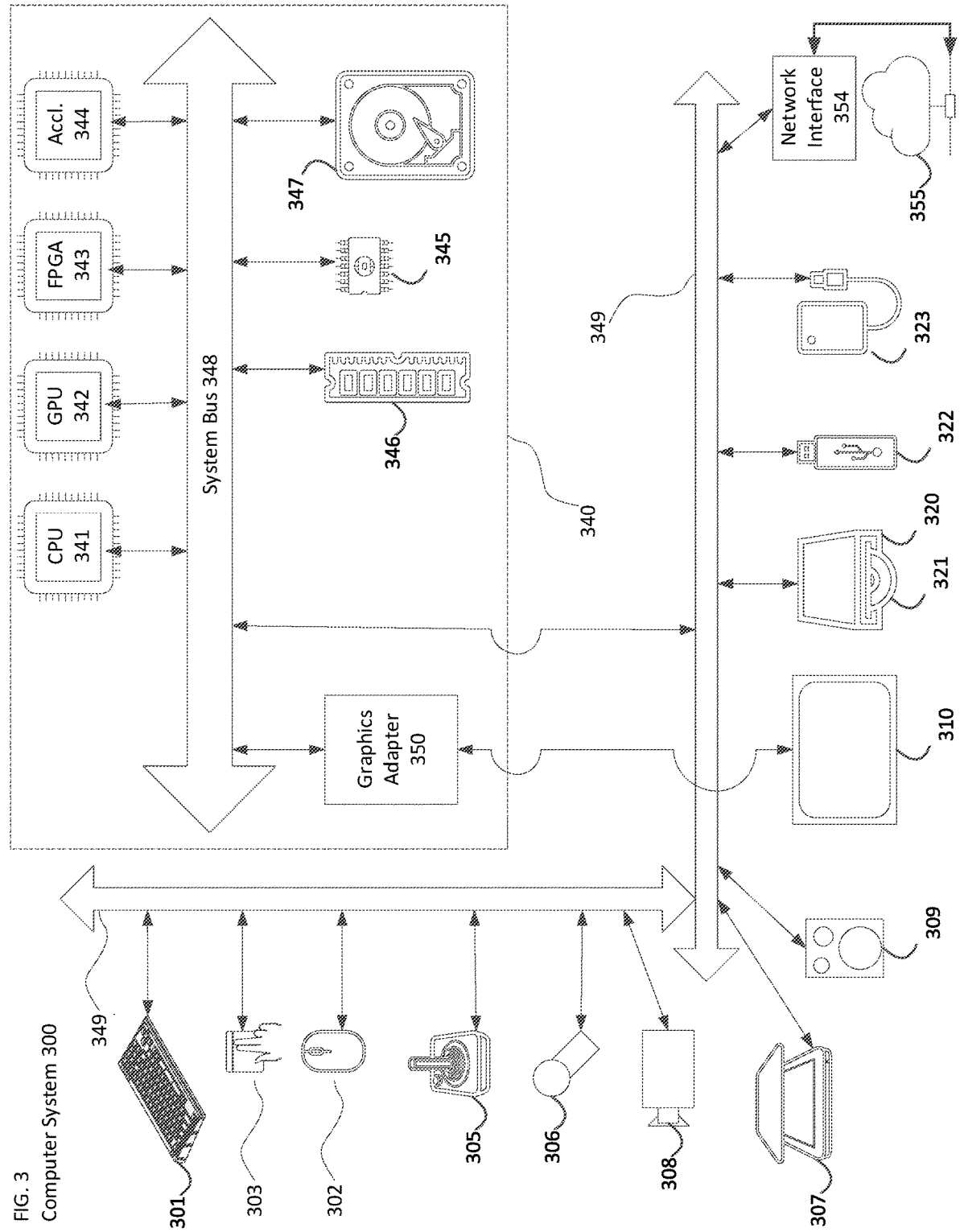
FIG. 3 is a schematic illustration of a computer system in accordance with an embodiment.

The components shown in FIG. 3 for computer system 300 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 300.

Computer system 300 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 301, mouse 302, trackpad 303, touch screen 310 and associated graphics adapter 350, data-glove, joystick 305, microphone 306, scanner 307, camera 308.

Computer system 300 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 310, data-glove, or joystick 305, but there can also be tactile feedback devices that do not serve as input devices), audio output devices (such as: speakers 309, headphones (not depicted)), visual output devices (such as screens 310 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 300 can also include human accessible storage devices and their associated media such as optical media including CD/DVD ROM/RW 920 with CD/DVD or the like media 321, thumb-drive 322, removable hard drive or solid state drive 323, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 300 can also include interface(s) to one or more communication networks (355). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters (354) that attached to certain general purpose data ports or peripheral buses (349) (such as, for example universal serial bus (USB) ports of the computer system 300; others are commonly integrated into the core of the computer system 300 by attachment to a system bus as described below (for example Ethernet interface into a PC computer system or cellular network interface into a smartphone computer system). As an example, network 355 may be connected to peripheral bus 349 using network interface 354. Using any of these networks, computer system 300 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces (354) as described above.

Aforementioned human interface devices, human-accessible storage devices, and network interfaces can be attached to a core 340 of the computer system 300.

The core 340 can include one or more Central Processing Units (CPU) 341, Graphics Processing Units (GPU) 342, specialized programmable processing units in the form of Field Programmable Gate Areas (FPGA) 343, hardware accelerators 344 for certain tasks, and so forth. These devices, along with Read-only memory (ROM) 345, Random-access memory (RAM) 346, internal mass storage such as internal non-user accessible hard drives, solid-state drives (SSDs), and the like 347, may be connected through a system bus 348. In some computer systems, the system bus 348 can be accessible in the form of one or more physical plugs to enable extensions by additional CPUs, GPU, and the like. The peripheral devices can be attached either directly to the core's system bus 348, or through a peripheral bus 349. Architectures for a peripheral bus include peripheral component interconnect (PCI), USB, and the like.

CPUs 341, GPUs 342, FPGAs 343, and accelerators 344 can execute certain instructions that, in combination, can make up the aforementioned computer code. That computer code can be stored in ROM 345 or RAM 346. Transitional data can be also be stored in RAM 346, whereas permanent data can be stored for example, in the internal mass storage 347. Fast storage and retrieve to any of the memory devices can be enabled through the use of cache memory, that can be closely associated with one or more CPU 341, GPU 342, mass storage 347, ROM 345, RAM 346, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 300, and specifically the core 340 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 340 that are of non-transitory nature, such as core-internal mass storage 347 or ROM 345. The software implementing various embodiments of the present disclosure can be stored in such devices and executed by core 340. A computer-readable medium can include one or more memory devices or chips, according to particular needs. The software can cause the core 340 and specifically the processors therein (including CPU, GPU, FPGA, and the like) to execute particular processes or particular parts of particular processes described herein, including defining data structures stored in RAM 346 and modifying such data structures according to the processes defined by the software. In addition or as an alternative, the computer system can provide functionality as a result of logic hardwired or otherwise embodied in a circuit (for example: accelerator 344), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

Non-Patent Literature

[1] IDF_10092019_high level syntax control for video coding_v2

LIST OF ACRONYMS

HLS: High level syntax
HEVC: High Efficiency Video Coding
VVC: Versatile Video Coding
CTU: Coding Tree Unit
SPS: Sequence Parameter Set
PPS: Picture Parameter Set
APS: Adaptive Parameter Set
PH: Picture Header
SH: Slice Header
SAO: Sample Adaptive Offset2
AU: Access Unit
NAL: Network Abstraction Layer
RBSP: Raw Byte Sequence Payload

What is claimed is:

1. A method of encoding or decoding video data, the method being performed by at least one processor and comprising:
    indicating, with a picture header syntax element, and for all slices included in a corresponding coded picture, whether the slices are B, P, and/or I type slices, the syntax element being coded using an unsigned integer, the picture header syntax element indicating whether syntax elements related to intra slice are to be coded or inter slice are to be coded, and
    encoding or decoding the video data based on types of slices indicated via the syntax element,
    wherein for the coded picture, based on a value of the picture header syntax element being a first value, only related intra-prediction syntax elements are coded, and based on the value of the picture header syntax element being a second value, only related inter-prediction syntax elements are coded, and
    wherein, based on the picture header syntax element being the first value, no inter-prediction syntax elements are coded, and wherein based the picture header syntax element being the second value, no intra-prediction syntax are coded.

2. The method of claim 1, wherein picture header related syntax elements are included in a slice layer raw byte sequence payload network abstraction layer unit, and a flag is used to indicate a presence of the picture header related syntax elements in the slice layer raw byte sequence payload network abstraction layer unit.

3. The method of claim 1, wherein the types of the slices may be inferred from a decoded access unit delimiter value.

4. The method of claim 1, wherein the types of the slices may be inferred when signaled in high level syntax.

5. The method of claim 1, wherein the types of the slices may be inferred based on a number of rectangular slices in the coded picture.

6. The method of claim 1, wherein the syntax element is a 0-th order Exp-Golomb-coded syntax element.

7. The method of claim 1, wherein the syntax element is a 2 bit syntax element configurable with three statuses.

8. The method of claim 1, wherein the syntax element is a 2 bit syntax element configurable with four statuses.

9. An apparatus for coding or encoding video data, the apparatus comprising:
   at least one memory configured to store computer program code; and
   at least one processor configured to access the at least one memory and operate according to the computer program code, the computer program code comprising:
      indicating code configured to cause the at least one processor to indicate, with picture header a syntax element, and for all slices included in a corresponding coded picture, whether the slices are B, P, and/or I type slices, the syntax element being coded using an unsigned integer, the picture header syntax element indicating whether syntax elements related to intra slice are to be coded or inter slice are to be coded, and
   encoding or decoding code configured to cause the at least one processor to encode or decode the video data based on types of slices indicated via the syntax element,
   wherein the indicating code is configured to cause the at least one processor to indicate the types of slices such that, for the coded picture, based on a value of the picture header syntax element being a first value, only related intra-prediction syntax elements are coded, and based on the value of the picture header syntax element being a second value, only related inter-prediction syntax elements are coded, and
   wherein the indicating code is further configured to cause the at least one processor to indicate the types of slices such that, based on the picture header syntax element being the first value, no inter-prediction syntax elements are coded, and wherein based the picture header syntax element being the second value, no intra-prediction syntax are coded.

10. The apparatus of claim 9, wherein the indicating code is configured to cause the at least one processor to indicate the types of slices such that picture header related syntax elements are included in a slice layer raw byte sequence payload network abstraction layer unit, and a flag is used to indicate a presence of the picture header related syntax elements in the slice layer raw byte sequence payload network abstraction layer unit.

11. The apparatus of claim 9, wherein the indicating code is configured to cause the at least one processor to indicate the types of slices such that the types of the slices may be inferred from a decoded access unit delimiter value.

12. The apparatus of claim 9, wherein the indicating code is configured to cause the at least one processor to indicate the types of slices such that the types of the slices may be inferred when signaled in high level syntax.

13. The apparatus of claim 9, wherein the indicating code is configured to cause the at least one processor to indicate the types of slices such that the types of the slices may be inferred based on a number of rectangular slices in the coded picture.

14. The apparatus of claim 9, wherein the indicating code is configured such that the syntax element is a 0-th order Exp-Golomb-coded syntax element.

15. The apparatus of claim 9, wherein the indicating code is configured such that the syntax element is a 2 bit syntax element configurable with three statuses.

16. A non-transitory computer-readable storage medium storing instructions that cause at least one processor to:
   indicate, with a picture header syntax element, and for all slices included in a corresponding coded picture, whether the slices are B, P, and/or I type slices, the syntax element being coded using an unsigned integer, the picture header syntax element indicating whether syntax elements related to intra slice are to be coded or inter slice are to be coded, and
   encode or decode video data based on types of slices indicated via the syntax element,
   wherein the instructions, when executed by the at least one processor, cause the at least one processor, based on a value of the picture header syntax element being a first value, code only related intra-prediction syntax elements, and based on the value of the picture header syntax element being a second value, code only related inter-prediction syntax elements, and
   wherein the instructions, when executed by the at least one processor, cause the at least one processor, based on the picture header syntax element being the first value, code no inter-prediction syntax elements, and wherein based the picture header syntax element being the second value, code no intra-prediction syntax.

* * * * *